(12) United States Patent
Lesesky

(10) Patent No.: US 10,157,384 B2
(45) Date of Patent: Dec. 18, 2018

(54) SYSTEM FOR LOGGING AND REPORTING DRIVER ACTIVITY AND OPERATION DATA OF A VEHICLE

(71) Applicant: Innovative Global Systems, LLC, Rock Hill, SC (US)

(72) Inventor: Alan C. Lesesky, Charlotte, NC (US)

(*) Notice: Subject to any disclaimer, the term of this patent is extended or adjusted under 35 U.S.C. 154(b) by 0 days.

(21) Appl. No.: 15/843,750

(22) Filed: Dec. 15, 2017

(65) Prior Publication Data

US 2018/0108013 A1 Apr. 19, 2018

Related U.S. Application Data

(63) Continuation of application No. 15/812,447, filed on Nov. 14, 2017, which is a continuation of application No. 15/049,744, filed on Feb. 22, 2016, now Pat. No. 9,818,120, which is a continuation-in-part of application No. 14/881,842, filed on Oct. 13, 2015,
(Continued)

(51) Int. Cl.
| | |
|---|---|
| *G06Q 20/40* | (2012.01) |
| *G07C 5/00* | (2006.01) |
| *G06Q 20/32* | (2012.01) |
| *G06Q 50/06* | (2012.01) |
| *G07C 5/08* | (2006.01) |

(52) U.S. Cl.
CPC ....... *G06Q 20/405* (2013.01); *G06Q 20/3226* (2013.01); *G06Q 20/3278* (2013.01); *G06Q 20/40145* (2013.01); *G06Q 50/06* (2013.01); *G07C 5/008* (2013.01); *G07C 5/085* (2013.01)

(58) Field of Classification Search
CPC ................ G07C 5/008; G07C 5/085
USPC ....................................... 701/33.4
See application file for complete search history.

(56) References Cited

U.S. PATENT DOCUMENTS 3,518,674 A 6/1970 Moorehead et al.
3,680,121 A 7/1972 Anderson et al.
(Continued)

FOREIGN PATENT DOCUMENTS

AU 3767589 1/1990
AU 7750229 5/2001
(Continued)

OTHER PUBLICATIONS

U.S. Appl. No. 11/352,411, filed Feb. 2006, Larschan et al.
(Continued)

*Primary Examiner* — Tan Q Nguyen
(74) *Attorney, Agent, or Firm* — Schwartz Law Firm, P.C.

(57) ABSTRACT

An automated at-the-pump method manages vehicle fuel purchases at a fuel station. The method includes transmitting driver identification data to a mobile device assigned to a vehicle driver. The driver identification data is electronically verified to confirm that the driver identification data received by the mobile device matches the assigned vehicle driver. Vehicle data is transmitted from a data bus of the vehicle to the mobile device for storage in the memory. The vehicle data and driver identification data are transmitted to a remote terminal. Using the remote terminal, the vehicle data and driver identification data are electronically authenticated. An authorization signal is then transmitted from the remote terminal to an at-the-pump fuel control terminal.

20 Claims, 10 Drawing Sheets

Related U.S. Application Data now Pat. No. 9,633,486, which is a continuation of application No. 14/149,152, filed on Jan. 7, 2014, now Pat. No. 9,159,175, which is a continuation of application No. 13/385,624, filed on Feb. 27, 2012, now Pat. No. 8,626,377, which is a continuation of application No. 13/134,928, filed on Jun. 21, 2011, now abandoned, which is a continuation of application No. 13/066,426, filed on Apr. 14, 2011, now abandoned, which is a continuation of application No. 12/931,437, filed on Feb. 1, 2011, now Pat. No. 8,032,277, which is a continuation of application No. 12/459,240, filed on Jun. 29, 2009, now Pat. No. 7,881,838, which is a continuation of application No. 11/299,762, filed on Dec. 13, 2005, now Pat. No. 7,555,378, which is a continuation of application No. 11/203,280, filed on Aug. 15, 2005, now Pat. No. 7,117,075.

(60) Provisional application No. 62/118,617, filed on Feb. 20, 2015.

(56) References Cited

U.S. PATENT DOCUMENTS

| | | |
|---|---|---|
| 3,714,650 A | 1/1973 | Fuller et al. |
| 3,757,200 A | 9/1973 | Ross et al. |
| 3,789,409 A | 1/1974 | Easton |
| 3,848,254 A | 11/1974 | Drebinger et al. |
| 3,906,166 A | 9/1975 | Cooper et al. |
| 4,053,893 A | 10/1977 | Boyer |
| 4,059,689 A | 11/1977 | Struble et al. |
| 4,067,061 A | 1/1978 | Juhasz |
| 4,083,003 A | 4/1978 | Haemmig |
| 4,107,689 A | 8/1978 | Jellinek |
| 4,152,693 A | 5/1979 | Ashworth, Jr. |
| 4,177,466 A | 12/1979 | Reagan |
| 4,222,052 A | 9/1980 | Dunn |
| 4,258,421 A | 3/1981 | Juhasz et al. |
| 4,303,850 A | 12/1981 | Johasz et al. |
| 4,307,455 A | 12/1981 | Johasz et al. |
| 4,338,512 A | 7/1982 | Ludwig |
| 4,428,052 A | 1/1984 | Robinson et al. |
| 4,428,057 A | 1/1984 | Setliff et al. |
| 4,435,711 A | 3/1984 | Ho et al. |
| 4,445,118 A | 4/1984 | Taylor et al. |
| 4,547,778 A | 10/1985 | Hinkle et al. |
| 4,555,619 A | 11/1985 | Anderson |
| 4,575,803 A | 3/1986 | Moore |
| 4,590,569 A | 5/1986 | Rogoff et al. |
| 4,630,292 A | 12/1986 | Juricich et al. |
| 4,644,351 A | 2/1987 | Zabarsky et al. |
| 4,651,157 A | 3/1987 | Gray et al. |
| 4,654,879 A | 3/1987 | Goldman et al. |
| 4,660,037 A | 4/1987 | Nakamura |
| 4,670,905 A | 6/1987 | Sandvos et al. |
| 4,677,429 A | 6/1987 | Glotzbach |
| 4,685,061 A | 8/1987 | Whitaker |
| 4,688,244 A | 8/1987 | Hannon et al. |
| 4,700,374 A | 10/1987 | Bini |
| 4,734,928 A | 3/1988 | Weiner et al. |
| 4,737,978 A | 4/1988 | Burke et al. |
| 4,740,792 A | 4/1988 | Sagey et al. |
| 4,742,357 A | 5/1988 | Rackley |
| 4,750,197 A | 6/1988 | Denekamp et al. |
| 4,764,466 A | 6/1988 | Trimble |
| 4,757,454 A | 7/1988 | Hisatake et al. |
| 4,774,670 A | 9/1988 | Palmieri |
| 4,775,999 A | 10/1988 | Williams |
| 4,776,003 A | 10/1988 | Harris |
| 4,787,053 A | 11/1988 | Moore |
| 4,788,637 A | 11/1988 | Tamaru |
| 4,791,572 A | 12/1988 | Green, III et al. |
| 4,791,671 A | 12/1988 | Takahashi et al. |
| 4,796,189 A | 1/1989 | Nakayama et al. |
| 4,797,948 A | 1/1989 | Milliorn et al. |
| 4,799,162 A | 1/1989 | Shinkawa et al. |
| 4,804,937 A | 2/1989 | Barbiaux et al. |
| 4,809,005 A | 2/1989 | Counselman, III |
| 4,809,177 A | 2/1989 | Windle et al. |
| 4,819,174 A | 4/1989 | Furuno et al. |
| 4,833,477 A | 5/1989 | Tendler |
| 4,833,702 A | 5/1989 | Shitara et al. |
| 4,843,575 A | 6/1989 | Crane |
| 4,850,614 A | 7/1989 | Shanahan et al. |
| 4,853,859 A | 8/1989 | Morita et al. |
| 4,854,048 A | 8/1989 | Goulet |
| 4,860,341 A | 8/1989 | D'Avello et al. |
| 4,866,762 A | 9/1989 | Pintar |
| 4,870,759 A | 10/1989 | Burton et al. |
| 4,876,738 A | 10/1989 | Selby |
| 4,884,208 A | 11/1989 | Marinelli et al. |
| 4,891,650 A | 1/1990 | Sheffer |
| 4,891,761 A | 1/1990 | Gray et al. |
| 4,897,642 A | 1/1990 | DiLullo et al. |
| 4,901,340 A | 2/1990 | Parker et al. |
| 4,905,270 A | 2/1990 | Ono |
| 4,907,290 A | 3/1990 | Crompton |
| 4,908,629 A | 3/1990 | Apsell et al. |
| 4,912,756 A | 3/1990 | Hop |
| 4,914,686 A | 4/1990 | Hagar, III et al. |
| 4,916,827 A | 4/1990 | Rayburn |
| 4,926,331 A | 5/1990 | Windle et al. |
| 4,939,652 A | 7/1990 | Steiner |
| 4,946,570 A | 7/1990 | Gerson et al. |
| 4,953,198 A | 8/1990 | Daly et al. |
| 4,963,865 A | 10/1990 | Ichikawa et al. |
| 4,993,062 A | 2/1991 | Dula et al. |
| 4,998,291 A | 3/1991 | Marui et al. |
| 5,003,317 A | 3/1991 | Gray et al. |
| 5,008,814 A | 4/1991 | Mathur |
| 5,014,206 A | 5/1991 | Scribner et al. |
| 5,019,963 A | 5/1991 | Alderson et al. |
| 5,021,961 A | 6/1991 | Ross et al. |
| 5,025,253 A | 6/1991 | DiLullo et al. |
| 5,032,845 A | 7/1991 | Velasco |
| 5,043,736 A | 8/1991 | Darnell et al. |
| 5,045,861 A | 9/1991 | Duffett-Smith |
| 5,046,007 A | 9/1991 | McCrery et al. |
| 5,046,082 A | 9/1991 | Zioker et al. |
| 5,055,851 A | 10/1991 | Sheffer |
| 5,058,201 A | 10/1991 | Ishii et al. |
| 5,068,656 A | 11/1991 | Sutherland |
| 5,090,050 A | 2/1992 | Heffernan |
| 5,101,500 A | 3/1992 | Marui |
| 5,119,102 A | 6/1992 | Barnard |
| 5,121,126 A | 6/1992 | Clagett |
| 5,121,325 A | 6/1992 | DeJonge |
| 5,131,019 A | 7/1992 | Sheffer et al. |
| 5,131,020 A | 7/1992 | Llebesny et al. |
| RE34,034 E | 8/1992 | O'Sullivan |
| 5,142,281 A | 8/1992 | Park |
| 5,142,654 A | 8/1992 | Sonberg et al. |
| 5,155,490 A | 10/1992 | Spradley, Jr. et al. |
| 5,155,847 A | 10/1992 | Kirouac et al. |
| 5,159,626 A | 10/1992 | Zicker |
| 5,166,694 A | 11/1992 | Russell et al. |
| 5,172,321 A | 12/1992 | Ghaem et al. |
| 5,191,529 A | 3/1993 | Ramsey et al. |
| 5,208,756 A | 5/1993 | Song |
| 5,223,844 A | 6/1993 | Mansell et al. |
| 5,224,211 A | 6/1993 | Roe |
| 5,225,842 A | 7/1993 | Brown et al. |
| 5,229,947 A | 7/1993 | Ross et al. |
| 5,235,633 A | 8/1993 | Dennison et al. |
| 5,237,612 A | 8/1993 | Raith |
| 5,243,529 A | 9/1993 | Kashiwazaki |
| 5,247,440 A | 9/1993 | Capurka et al. |
| 5,247,564 A | 9/1993 | Zicker |
| 5,249,127 A | 9/1993 | Komatsu |
| 5,252,982 A | 10/1993 | Frei |
| 5,261,118 A | 11/1993 | Vanderspool, II et al. |

(56) References Cited

U.S. PATENT DOCUMENTS

| | | |
|---|---|---|
| 5,270,936 A | 12/1993 | Fukushima et al. |
| 5,276,729 A | 1/1994 | Higuchi et al. |
| 5,293,163 A | 3/1994 | Kakihara et al. |
| 5,297,191 A | 3/1994 | Gerszberg |
| 5,297,192 A | 3/1994 | Gerszberg |
| 5,299,132 A | 3/1994 | Wortham |
| 5,303,163 A | 4/1994 | Ebaugh et al. |
| 5,311,194 A | 5/1994 | Brown |
| 5,323,322 A | 6/1994 | Mueller et al. |
| 5,337,236 A | 8/1994 | Fogg et al. |
| 5,347,274 A | 9/1994 | Hassett |
| 5,359,528 A | 10/1994 | Haendel et al. |
| 5,365,516 A | 11/1994 | Jandrell |
| 5,392,458 A | 2/1995 | Sasuta et al. |
| 5,394,136 A | 2/1995 | Lammers et al. |
| 5,396,540 A | 3/1995 | Gooch |
| 5,428,542 A | 6/1995 | Liesveld |
| 5,452,446 A | 9/1995 | Johnsen |
| 5,488,352 A | 1/1996 | Jasper |
| 5,579,233 A | 11/1996 | Burns |
| 5,586,130 A | 12/1996 | Doyle |
| 5,587,890 A | 12/1996 | Happ et al. |
| 5,594,425 A | 1/1997 | Ladner et al. |
| 5,605,182 A | 2/1997 | Oberrecht et al. |
| 5,612,875 A | 3/1997 | Haendel et al. |
| 5,633,622 A | 5/1997 | Patterson |
| 5,638,077 A | 6/1997 | Martin |
| 5,648,768 A | 7/1997 | Bouve |
| 5,659,470 A | 8/1997 | Goska et al. |
| 5,677,667 A | 10/1997 | Lesesky et al. |
| 5,680,328 A | 10/1997 | Skorupski et al. |
| 5,694,322 A | 12/1997 | Westerlage et al. |
| 5,716,071 A | 2/1998 | Stanley et al. |
| 5,721,678 A | 2/1998 | Widl |
| 5,729,458 A | 3/1998 | Poppen |
| 5,740,548 A | 4/1998 | Hudgens |
| 5,742,229 A | 4/1998 | Smith |
| 5,742,915 A | 4/1998 | Stafford |
| 5,771,459 A | 6/1998 | Demery et al. |
| 5,787,373 A | 7/1998 | Migues et al. |
| 5,798,577 A | 8/1998 | Lesesky et al. |
| 5,802,545 A | 9/1998 | Coverdill |
| 5,815,071 A | 9/1998 | Doyle |
| 5,848,365 A | 12/1998 | Coverdill |
| D403,659 S | 1/1999 | Lesesky |
| D404,170 S | 1/1999 | Lesesky |
| 5,864,831 A | 1/1999 | Schuessler |
| 5,880,958 A | 3/1999 | Helms et al. |
| 5,884,473 A | 3/1999 | Noda et al. |
| 5,886,331 A * | 3/1999 | Lyons, Jr. ............ G06F 15/025 235/145 R |
| 5,897,602 A | 4/1999 | Mizuta |
| 5,905,433 A | 5/1999 | Wortham |
| 5,913,180 A | 6/1999 | Ryan |
| 5,917,434 A | 6/1999 | Murphy |
| 5,917,632 A | 6/1999 | Lesesky |
| 5,919,239 A | 7/1999 | Fraker et al. |
| 5,922,041 A | 7/1999 | Anderson |
| 5,923,572 A | 7/1999 | Pollock |
| 5,924,075 A | 7/1999 | Kanemitsu |
| 5,928,291 A | 7/1999 | Jenkins et al. |
| 5,954,773 A | 9/1999 | Luper |
| 5,963,129 A | 10/1999 | Warner |
| 5,970,481 A | 10/1999 | Weslerlage et al. |
| 5,974,356 A | 10/1999 | Doyle et al. |
| 5,987,378 A | 11/1999 | Schipper et al. |
| 5,999,091 A | 12/1999 | Wortham |
| 6,008,740 A | 12/1999 | Hopkins |
| 6,025,563 A | 2/2000 | Lesesky et al. |
| 6,026,384 A | 2/2000 | Poppen |
| 6,026,868 A | 2/2000 | Johnson, Jr. |
| 6,064,299 A | 5/2000 | Lesesky et al. |
| 6,064,929 A | 5/2000 | Migues et al. |
| 6,075,458 A | 6/2000 | Ladner et al. |
| 6,085,845 A | 7/2000 | Bates |
| 6,087,965 A | 7/2000 | Murphy |
| 6,088,650 A | 7/2000 | Schipper et al. |
| 6,089,588 A | 7/2000 | Lesesky et al. |
| 6,104,282 A | 8/2000 | Fragoso et al. |
| 6,108,591 A | 8/2000 | Segal et al. |
| 6,111,524 A | 8/2000 | Lesesky et al. |
| 6,115,655 A | 9/2000 | Keith et al. |
| 6,127,939 A | 10/2000 | Lesesky et al. |
| 6,141,609 A | 10/2000 | Herdeg et al. |
| D434,006 S | 11/2000 | Lesesky et al. |
| 6,150,793 A | 11/2000 | Lesesky et al. |
| 6,151,549 A | 11/2000 | Andrews et al. |
| 6,167,333 A | 12/2000 | Gehlot |
| 6,181,995 B1 | 1/2001 | Luper et al. |
| 6,185,484 B1 | 2/2001 | Rhinehart |
| 6,185,501 B1 | 2/2001 | Smith et al. |
| 6,193,154 B1 | 2/2001 | Phillips et al. |
| 6,195,023 B1 | 2/2001 | Walsh et al. |
| 6,215,395 B1 | 4/2001 | Slaughter et al. |
| 6,226,577 B1 * | 5/2001 | Yeo ..................... G01P 1/122 340/441 |
| 6,253,129 B1 | 6/2001 | Jenkins et al. |
| 6,254,201 B1 | 7/2001 | Lesesky et al. |
| 6,259,988 B1 | 7/2001 | Galkowski et al. |
| 6,278,935 B1 | 8/2001 | Kaplan et al. |
| 6,285,953 B1 | 9/2001 | Harrison et al. |
| 6,317,668 B1 * | 11/2001 | Thibault ............... G07C 5/008 701/24 |
| 6,331,825 B1 | 12/2001 | Ladner et al. |
| 6,351,695 B1 | 2/2002 | Weiss |
| 6,352,137 B1 | 3/2002 | Stegall et al. |
| 6,353,796 B1 | 3/2002 | Schipper et al. |
| 6,359,570 B1 | 3/2002 | Adcox et al. |
| 6,378,959 B2 | 4/2002 | Lesesky et al. |
| 6,393,346 B1 | 5/2002 | Keith et al. |
| 6,411,203 B1 | 6/2002 | Lesesky et al. |
| 6,411,206 B1 | 6/2002 | Weant et al. |
| 6,421,590 B2 | 7/2002 | Thibault |
| 6,424,893 B1 | 7/2002 | Byrene et al. |
| 6,453,731 B1 | 9/2002 | Yaegashi |
| 6,459,367 B1 | 10/2002 | Green et al. |
| 6,496,377 B1 | 12/2002 | Happ et al. |
| 6,501,375 B1 | 12/2002 | Weant et al. |
| 6,502,035 B2 | 12/2002 | Levine |
| 6,519,529 B2 | 2/2003 | Doyle |
| 6,522,265 B1 | 2/2003 | Hillman et al. |
| 6,525,672 B2 | 2/2003 | Chainer et al. |
| 6,526,341 B1 * | 2/2003 | Bird ..................... G07C 5/008 340/573.1 |
| 6,533,465 B1 | 3/2003 | Lesesky et al. |
| 6,571,151 B1 | 5/2003 | Leatherman |
| 6,571,168 B1 | 5/2003 | Murphy et al. |
| 6,582,033 B2 | 6/2003 | Lesesky et al. |
| 6,604,038 B1 | 8/2003 | Lesesky et al. |
| 6,608,554 B2 | 8/2003 | Lesesky et al. |
| 6,611,686 B1 | 8/2003 | Smith et al. |
| 6,650,224 B1 | 11/2003 | Weigl et al. |
| 6,671,646 B2 | 12/2003 | Manegold et al. |
| 6,677,854 B2 | 1/2004 | Dix |
| 6,681,987 B1 | 1/2004 | Ford |
| 6,690,294 B1 | 2/2004 | Zierden |
| 6,697,735 B2 | 2/2004 | Doyle |
| 6,714,857 B2 | 3/2004 | Kapolka et al. |
| 6,744,352 B2 | 6/2004 | Lesesky et al. |
| 6,753,771 B2 | 6/2004 | Lesesky |
| 6,799,814 B2 | 10/2004 | Lesesky et al. |
| 6,804,626 B2 | 10/2004 | Manegold et al. |
| 6,807,481 B1 | 10/2004 | Gastelum |
| 6,816,090 B2 | 11/2004 | Techchandani et al. |
| 6,862,521 B1 | 3/2005 | Fox |
| 6,892,131 B2 | 5/2005 | Coffee et al. |
| 6,894,606 B2 | 5/2005 | Forbes et al. |
| 6,909,398 B2 | 6/2005 | Knockeart et al. |
| 6,946,953 B2 | 9/2005 | Lesesky et al. |
| 7,015,800 B2 | 3/2006 | Lesesky et al. |
| 7,040,435 B1 | 5/2006 | Lesesky et al. |
| 7,102,494 B2 | 9/2006 | Lesesky et al. |
| 7,117,075 B1 | 10/2006 | Larschan et al. |
| 7,117,121 B2 | 10/2006 | Brinton et al. |

(56) References Cited

U.S. PATENT DOCUMENTS

| | | | |
|---|---|---|---|
| 7,289,877 | B2 | 10/2007 | Wilson |
| 7,379,897 | B2 | 5/2008 | Pinkus |
| 7,543,611 | B2 | 6/2009 | Kallberg |
| 7,555,378 | B2 | 6/2009 | Larschan et al. |
| 7,881,838 | B2 | 2/2011 | Larschan et al. |
| 8,032,277 | B2 | 10/2011 | Larschan et al. |
| 8,626,377 | B2 | 1/2014 | Larschan et al. |
| 9,159,175 | B2 | 10/2015 | Larschan et al. |
| 9,633,486 | B2 | 4/2017 | Lesesky et al. |
| 9,818,120 | B2 | 11/2017 | Lesesky |
| 2001/0018628 | A1 | 8/2001 | Jenkins et al. |
| 2001/0020204 | A1 | 9/2001 | Runyon et al. |
| 2001/0040408 | A1 | 11/2001 | Lesesky et al. |
| 2002/0030403 | A1 | 3/2002 | Lesesky et al. |
| 2002/0035421 | A1* | 3/2002 | Warkentin ............. G07C 5/008 701/31.4 |
| 2002/0060625 | A1 | 5/2002 | Lesesky et al. |
| 2002/0133275 | A1 | 9/2002 | Thibault |
| 2002/0165694 | A1* | 11/2002 | Chene .................. G06F 15/025 702/182 |
| 2002/0183905 | A1 | 12/2002 | Maeda et al. |
| 2003/0036823 | A1 | 2/2003 | Mahvi |
| 2003/0097208 | A1 | 5/2003 | Doyle |
| 2003/0100305 | A1 | 5/2003 | Parisi |
| 2003/0204362 | A1 | 10/2003 | Beresford et al. |
| 2003/0218847 | A1 | 11/2003 | Lesesky et al. |
| 2004/0004539 | A1 | 1/2004 | Collins |
| 2004/0073468 | A1 | 4/2004 | Vyas et al. |
| 2004/0157650 | A1 | 8/2004 | Wissinger et al. |
| 2004/0233284 | A1 | 11/2004 | Lesesky et al. |
| 2004/0243285 | A1 | 12/2004 | Grounder |
| 2005/0016787 | A1 | 1/2005 | Lesesky et al. |
| 2005/0060070 | A1 | 3/2005 | Kapolka et al. |
| 2005/0099279 | A1 | 5/2005 | Forbes et al. |
| 2005/0134440 | A1 | 6/2005 | Breed |
| 2005/0190045 | A1 | 9/2005 | Lesesky et al. |
| 2005/0203816 | A1* | 9/2005 | Monsor .................. G06Q 40/00 705/31 |
| 2005/0280514 | A1 | 12/2005 | Doan |
| 2006/0095175 | A1 | 5/2006 | deWaal et al. |
| 2006/0095199 | A1 | 5/2006 | Lagassey |
| 2006/0099944 | A1 | 5/2006 | Ross et al. |
| 2006/0192427 | A1 | 8/2006 | Lesesky et al. |
| 2006/0212195 | A1 | 9/2006 | Veith et al. |
| 2006/0213731 | A1 | 9/2006 | Lesesky et al. |

FOREIGN PATENT DOCUMENTS

| | | |
|---|---|---|
| CA | 2 391 155 | 5/2001 |
| DE | 35 16 357 | 6/1994 |
| DE | 44 04 800 | 8/1995 |
| DE | 197 44 419 | 4/1999 |
| DE | 100 55 287 | 5/2002 |
| EP | 0 242 099 | 10/1987 |
| EP | 0 367 935 | 5/1990 |
| EP | 0 290 725 | 8/1993 |
| EP | 0 744 322 A2 | 5/1996 |
| EP | 0 802 082 B1 | 2/1997 |
| EP | 1 128 333 | 8/2001 |
| EP | 1 419 935 | 5/2004 |
| FR | 2 717 596 | 9/1995 |
| GB | 2 193 861 | 2/1988 |
| GB | 2 221 113 | 1/1990 |
| JP | 59-161941 | 9/1984 |
| JP | 63-175537 | 7/1988 |
| JP | 63-219238 | 9/1988 |
| JP | 1-1226226 | 9/1989 |
| WO | WO 89/04035 | 5/1989 |
| WO | WO 89/12835 | 12/1989 |
| WO | WO 93/22848 | 11/1993 |
| WO | WO 97/17232 | 5/1997 |
| WO | WO 97/28988 | 8/1997 |
| WO | WO 98/34812 | 8/1998 |
| WO | WO 98/37432 | 8/1998 |
| WO | WO 99/06987 | 2/1999 |
| WO | WO 99/21383 | 4/1999 |
| WO | WO 99/35009 | 7/1999 |
| WO | WO 01/36234 | 5/2001 |

OTHER PUBLICATIONS

U.S. Appl. No. 11/352,409, filed Feb. 2006, Larschan et al.
U.S. Appl. No. 11/352,410, filed Feb. 2006, Larschan et al.
U.S. Appl. No. 11/352,395, filed Feb. 2006, Larschan et al.
U.S. Appl. No. 12/931,437, filed Jan. 2011, Larschan et al.
U.S. Appl. No. 11/066,426, filed Apr. 2011, Larschan et al.
U.S. Appl. No. 13/134,928, filed Jun. 2011, Larschan et al.
Alsip, D.H., J.M Butler and J.T. Radice, "Implementation of the U.S. Coast Guard's Differential GPS Navigation Service", U.S. Coast Guard Headquarters, Jun. 28, 1993, pp. 1-10.
"Appendix B, The 1991 Radionavigation User Conference," Department of Transportation, Date unknown, pp. 1-2.
Burin, Don. "CDPD—A Bandwith Optimization Technique for Cellular Telephones," Computer Design's OBM Integration, May 1994, pp. 19-20.
DeSadaba, R., "Personal Communications in the Intelligent Network", British Telecommunications Engineering, vol. 9, Aug. 1990, pp. 80-83.
"GPS Facts & Figures" Brochure, U.S. Department of Transportation, U.S. Coast Guard, May 1993.
"GPS Navstar Global Positionaing System User's Overview—YEE-82-009D", Navstar Global Positioning System Joint Program Office, Mar. 1991, pp. 1-164.
Ladendof, Kirk, First in Flight—Using State-of-the-Art Technology, Austin—Basad Arrowsmith Technologies Establishes Itself . . . ; Austin America-Statesman, Jan. 30, 1995; 3 pgs.
"Motorola GPS Technical Reference Manual", Oct. 1993, Manual Cover, Title Page.
Ott, Gary D., "Vehicle Location in Cellular Mobile Radio Systems", IEEE, vol. VT-26, No. 1, Feb. 1997, pp. 43-46.
Reynolds, James C. et al, "GPS-Based Vellel Position Monitoring and Display System", IEEE, 1990, pp. 601-607.
Schlechte, Gene L., LCDR, "US Coast Guard Bulletin Board System Document 'Design.Txt'-Design Process . . . "; U.S. Coast Guard Omega Navigation System Center, date unknown, p. 1-21.
"Trimpack" Brouchure, TrimbleNavigation, date unknown, 1 page.
Tripmaster, Federal & State Compliance; http://www.tripmaster.com/html/solutions/Solutions_subpages/tm_fed_state_comp.html. Mar. 5, 2005.
Tripmaster: Productes; http://www/tripmaster.com/html/products/tm_products.html; Mar. 5, 2005.
Tripmaster Corporation; http://www.tripmaster.com/html/products/sub_pages/tm_wireless/html; Mar. 5, 2005.
Tripmaster: DDT II; http://www.tripmaster.com/html/products/sub_pages/tm_terminal.html; Mar. 5, 2005.
Tripmaster: Sync; http://www.tripmaster.com/html/products/sub_pages/tm_sync.html; Mar. 5, 2005.
Tripmaster: JJ Keller Fuel Tax Mater; http://www.tripmaster.com/html/products/sub_pages/tm_taxmaster.html; Mar. 5, 2005.
Tripmaster: Tripmaster's MobilecomJ; http://www.tripmaster.com/html/products/sub_pages/tm_mobilecom.html; Mar. 5, 2005.
"US Coast Guard Differential GPS" Brochure, U.S. Department of Transportation, United States Coast Guard, May 1993.
On-Board Recorders: Literature and Technology Review, FMCSA-2004-189403.
"Electronic On-Board Recorders for Hours-of-Service Compliance," Letter from ATC Leasing Company to U.S. Department of Transportation, Nov. 11, 2004, FMCSA-2004-18940-324.
Comments of the Gases and Welding Distributors Assocation, Docket No. FMCSA-2004-18940, 49 CFR Part 395, Electronic On-Board Recorders for Hours-of-Service . . . , Nov. 30, 2004, p. 1-4.
"FMCSA ANPRM on Electronic On-Board Recorders (EOBRs)," Letter from Truckload Carrier's Association to U.S. Dept of Transportation, Docket No. FMCSA-2004-18940.

(56) References Cited

OTHER PUBLICATIONS

Electronic Onboard Recorders for Hours-of-Service Compliance, Peoplenet, DMS Docket No. FMCSA-2004-18940, Nov. 2004, pp. 1-20.
"Electronic On-Board Recorders for Hours-of-Service Compliance, Advance Notice of Proposed Rulemaking, 69 FR 53386, Sep. 1, 2004," Letter from Advocates . . . ; Nov. 30, 2004.
"Electronic On-Board Recorders for Hour-of-Service Compliance," Comments submitted on behalf of Commercial Vehicle Safety All . . . ; Docket No. FMCSA-2004-18940 p. 1-11; Nov. 30, 2004.
"Revised Submission of the Fed. Motor Carriors Admin. in Response to Advance Notice of Proposed Rule Making re EOBR,"IBM Business Consult Svc-Public Sect; FMCSA-04-18940-334.
Letter from Dept of California Highway Patrol to US Dept of Transportation, Docket No. FMCSA-2004-18940-19, Nov. 23, 2004.
"Electronic On-Board Recorders for Hours-of-Service Compliance,"Letter from Siemens VDO Automotive to US Dept of Transportation, Docket No. FMCSA-2004-18940.
Letter from U.S. Dept of Transportation to Adam T. Wegel, Delphi Corporation, Docket No. FMCSA-2004-18940-1, MC-PSV, Dec. 1, 2003.
Beal, Joel, "Tripmaster Corp Comments on Advanced Notice of Proposed Rulemaking Pub in Docket # 18940, RIN 2123-AA89," Docket # FMCSA-2004-17286, Fed Motor . . . Nov. 30, 2004 p. 1-27.
Campbell et al., Kenneth, "Electronic Recorder Study," Final Report, The University of Michigan Transportation Research Institute, Docket No. FMCSA-2004-18940-7, Jun. 1998.
Witty, Eric, Comments on ANPRM, DOT DMS Docket No. FMCSA-2004-17286, XATA Corporation, Oct. 25, 2004, pp. 1-18.
Tomlinson, William, Response to Advanced Notice of Proposed Rulemaking associated with Costs and Benefits of Electronic On-Board Recorders (EOBR), Oct. 21, 2004.
"Commercial Vehicle: Operational Test Project Eyes Satellite Location for State Fee Payment," 02711212/9, The Gale Group, ISSN: 1054-2647, Feb. 1, 1993.
"Commercial Vehicle: Rockwell Onboard Unit Passes "Validity Test" in AMASCOT Project," 03471184/9, The Gale Group, ISSN:1054-2647, Jul. 18, 1994.
"NPRM Request for Comment on Electronic On-Board Recorders (EOBR) for Hours-of-Service Compliance," White Paper submitted to DOT Fed Motor Carrior Safety Admin . . . , Nov. 2004.
"Comments of the Owner-Operator Ind.Drivers Assoc, Inc," in Response to an Advance Notice of Proposed Rulemaking Req for comments EOBR . . . Docket FMCSA-2004-18940, Nov. 30, 2004.
"Comments on Fed. Motor Carrier Safety Admin Advanced Notice of Proposed Rulemaking & Request for Comments re EOBR", Docket No. FMCSA-2004-18940, Nov. 30, 2004, pp. 1-15.
MacCleery, Laura; Comments in Resp to Xora, Inc., App for Exemption from Design Requirements for Automatic On-Board Recording Devices (AOBR), Docket #FMCSA-2005-21338, Jul. 8, 2005.
"Comments of the Owner-Operator Independent Drivers Assoc, Inc.", in Response to a Notice of App for Exemption; Requirements for Comments, Docket #FMCSA-2005-21338-11, Jun. 30, 2005.
Application for Exemption by Xora, Inc., Docket No. FMCSA-2005-21338-5, Jun. 16, 2005, pp. 1-24.
IFTA Procedures Manual, Jan. 1996, Revised Jul. 2000, pp. 1-35.
"Federal Register Response to Electronic On-Board Recorders for Hours-of-Service Compliance," IACP Hughway Safety Committee, Docket No. FMCSA-2004-18940, pp. 1-2.
Federal Motor Carrier Safety Adminstration, Hours of Service (HOS) Research and Analysis Modules, Docket No. FMCSA-2004-18940-2, Jan. 21, 2003.
Guerrero, Thelma, "Oregon to Use Facial Scan for CDL Licensing," American Trucking Associations, Inc., Sep. 29, 2005.
Guerrero, Thelman, "Diesel, Gas Prices Decline," Transport Topics, Sep. 26, 2005.
AMASCOT: Automated Milage and Stateline Crossing Operational Test, Final Report, Iowa State University, Center for Transportation Research and Education, May 1, 1996.
FuelMaster: Fuel Management Systems, http://www.syntech-fuelmaster.com/products/aim2/aim2.asp, reprinted on Mar. 2, 2007.
"Electronic On-Board Recorders for Hours-of-Service Compliance," Federal Register, vol. 69, No. 169, Sep. 1, 2004, Proposed Rules, 49.
CFR Part 395, Docket No. FMCSA-2004-18940, RIN-2126-AA89.
Notice of Application for Exemption, Supplemental Comments of Xora, Docket No. FMCSA-2005-21338.
Guidelines for Electronic On-Board Recorders (EOBR), TMC Recommended Practice, Proposed RP1219(T), Working Draft Version-6 copyright 2005-TMC/ATA, Updated Sep. 18, 2005, pp. 1-24.
Detroit Diesel Corp., "Infrared Information System (IRIS)," 2002.
James L. Wayman,"Biometrics Identification Standards Research", College of Engineering—San Jose State University, FHWA Contract DTFH61-95-C-00165 vol. I-Rev 2, Dec. 1997, 93 pg.
Surface Vehicle Standard, "Power Line Carrier Communications for Commercial Vehicles", SAE International J2497, Oct. 2002, 17 pages.
Surface Vehicle Recommended Practice, "Joint SAE/TMC Electronic Data Interchange B/T Microcomputer Systems in Heavy-Duty Vehicle App", SAE Int'l J1587, Rev. Jul. 1998, 196 pgs.
Qualcomm Incorporated; OmniTracs (Registered Trademark) Customer Service Bulletin 0017; Oct. 4, 1990, pp. 1-6.
CC7 Surface Vehicle Recommended Practice, "Recommended Practice for a Serial Control and Communications Vehicle Network," SAE International J1939, Revised 2005, (257 pages).
Vehicle Electronic Systems for the 1990's; Kopec, James W.; Presented to S. 12 Mini-Tech session, TMC '91; pp. 1-11.
Qualcomm OmniTracs System; J1708/J1587 Application Document, Feb. 6, 1995; pp. 1-7.
Technical Overview; OmniTracs (Registered Trademark); Sep. 1992; pp, 1-22.
SAE The Engineering Society for Advancing Mobility Land Sea Air & space; A product of Cooperative Engineering Program; SAE1708 JUN87, Truck & Bus Practice, Jun. '87; pp. 1-12.
Vesplex; "Proposed Industry Standard for Tractor/Trailer Communications", Lesesky, Alan C., Vehicle Enhancement Systems, Inc. (VES); Sep. 1, 1993, pp. 1-15.
Technical Overview, OmniTracs (Registered Trademark); Apr. 1995; pp. 1-21.
SensorTracs Installation Guide; OmniTracs; Jun. 1992; pp. 1-56.
"Communications Revolution in Trucking"; Cross, Rich; Commercial Carrier Journal Mar. 1991; pp. 1-67.
SensorTracs Installation Guide; OmniTracs; Feb. 1992; pp. 1-58.
SensorTracs Installation Guide; OmniTracs; Jun. 1993; pp, 1-55.
U.S. Appl. No. 15/812,447, filed Nov. 14, 2017.

\* cited by examiner

SYSTEM FOR LOGGING AND REPORTING DRIVER ACTIVITY AND OPERATION DATA OF A VEHICLE

TECHNICAL FIELD AND BACKGROUND OF THE DISCLOSURE

The present disclosure relates broadly and generally systems, methods, and apparatus for logging and reporting driver activity and vehicle operation. In other exemplary embodiments, the disclosure comprises systems, methods, and apparatus for automated at-the-pump management of vehicle fuel purchases. In still further embodiments, the disclosure comprises systems, methods, and apparatus for diagnosing and managing vehicle faults.

SUMMARY OF EXEMPLARY EMBODIMENTS

Various exemplary embodiments of the present disclosure are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises an automated at-the-pump method for managing vehicle fuel purchases at a fuel station. The method comprises transmitting driver identification data to a mobile device assigned to a vehicle driver. The mobile device comprises wireless communication hardware (e.g., WIFI, BLUETOOTH, infrared), an input means, a processor, and memory. The exemplary method electronically verifies that the driver identification data received by the mobile device matches the assigned vehicle driver. In other words, the method uses the driver identification data received by the mobile device to confirm that the vehicle driver is an authorized (and proper) user of the mobile device. Event setting data is recorded in the memory of the mobile device. Vehicle data is transmitted from a data bus of the vehicle to the mobile device for storage in the memory. The vehicle data and driver identification data are transmitted to a remote terminal. Using the remote terminal, the vehicle data and driver identification data are electronically authenticated. An authorization signal is transmitted from the remote terminal to an at-the-pump fuel control terminal. The authorization signal enables dispensing of fuel from a station pump to the vehicle. After the vehicle is fueled, fuel purchase data is transmitted from the at-the-pump fuel control terminal to at least one of the remote terminal and mobile device.

According to another exemplary embodiment, the method further comprises electronically storing the driver identification data on an RFID card.

According to another exemplary embodiment, the driver identification data comprises at least one in a group consisting of a passcode, first and last name, e-mail address, and telephone number.

According to another exemplary embodiment, the input means of the mobile device comprises a keypad. The step of electronically verifying further comprises matching a passcode entered by the driver using the keypad of the mobile device to a passcode stored in memory of the mobile device.

According to another exemplary embodiment, the input means of the mobile device comprises a microphone. The step of electronically verifying further comprises matching a voice code spoken by the driver into the microphone of the mobile device to a voice code stored in memory of the mobile device.

According to another exemplary embodiment, the step of electronically verifying comprises reading biometric data of the vehicle driver and matching the biometric data to data stored in memory of the mobile device.

According to another exemplary embodiment, the biometric data is selected from a group consisting of facial, retinal, and thumb print identifiers.

According to another exemplary embodiment, the event setting data comprises at least one in a group consisting of current time, date, and (GPS) location. The event setting data may be recorded in the memory of the mobile device automatically at any step of the exemplary method; for example, at the time the authorization signal is transmitted from the remote terminal to an at-the-pump fuel control terminal, or at the time the fuel purchase data is transmitted from the at-the-pump fuel control terminal.

According to another exemplary embodiment, the vehicle data comprises at least one in a group consisting of, for example, vehicle serial number, engine VIN, mileage, diagnostic codes, fuel level, battery voltage, tire pressure, and ABS and alternator status.

According to another exemplary embodiment, the vehicle data bus comprises at least one in a group consisting of RS232, SAE J1708, SAE J1850, SAE J1939, SAE J2497, OB-2, and CAN.

According to another exemplary embodiment, the fuel purchase data comprises at least one in a group consisting of gallons of fuel purchased, cost per gallon, and total fuel cost.

According to another exemplary embodiment, the method further comprises storing the fuel purchase data on an electronic on-board recorder in the vehicle.

According to another exemplary embodiment, the method further comprises storing the vehicle data on an electronic on-board recorder in the vehicle.

According to another exemplary embodiment, the method further comprises storing the driver identification data on an electronic on-board recorder in the vehicle.

According to another exemplary embodiment, after the vehicle is fueled, the method comprises transmitting the fuel purchase data from the at-the-pump fuel control terminal to the electronic on-board recorder in the vehicle.

According to another exemplary embodiment, the step of transmitting vehicle data from the data bus of the vehicle to the mobile device comprises utilizing wireless near-field communication technology.

According to another exemplary embodiment, the method further comprises transmitting vehicle data from the mobile device to the at-the-pump fuel control terminal.

According to another exemplary embodiment, the step of transmitting vehicle data from the mobile device to the at-the-pump fuel control terminal comprises utilizing wireless near-field communication technology.

According to another exemplary embodiment, the method further comprises transmitting the fuel purchase data from the at-the-pump fuel control terminal to the mobile device utilizing wireless near-field communication technology.

According to another exemplary embodiment, data is communicated between the mobile device, at-the-pump fuel control terminal, and remote terminal utilizing a wireless connection selected from a group consisting of a WIFI connection, a BLUETOOTH connection, cellular connection, and an infrared connection.

The term "remote terminal" refers broadly herein to any mobile device, as described below, network server, cloud server, desktop, laptop computer, netbook, e-reader, tablet computer, mobile phone, personal digital assistant, or other fixed or mobile electronic data processing, collection, transmission and/or storage device (programmable or non-programmable) which is physically separate from and unattached to components of the station pump including the at-the-pump fuel control terminal. In one example, the remote terminal is physically distant from the fuel station. In another example, the remote terminal is located at a corporate office, fleet management center, or other such establishment—also physically distant from the fuel station.

Exemplary Mobile Device

The mobile computing device (or "Mobile Device") may incorporate or comprise any general or specific purpose machine with processing logic capable of manipulating data according to a set of program instructions. Examples of Mobile Devices include a laptop computer, netbook, e-reader, tablet computer, mobile phone, personal digital assistant, desktop, and others. In one exemplary embodiment, the Mobile Device comprises a smartphone or other high-end mobile phone using an operating system such as Google's Android, Apple's iOS4 and iOS5, Maemo, Bada, Symbian, Windows Phone, Palm, Blackberry, and others. The exemplary Mobile Device may include a high-resolution touchscreen (display screen), a web browser, high-speed data access via Wi-Fi and mobile broadband, and advanced application programming interfaces (APIs) for running third-party applications. The Mobile Device may also be equipped with NFC, and paired with NFC tags or stickers which can be programmed by NFC apps and other mobile apps on the device. For example, BlackBerry devices support NFC using BlackBerry Tag on a number of devices running BlackBerry OS 7.0 and greater. Microsoft has also added native NFC functionality in its mobile OS with Windows Phone 8, as well as the Windows 8 operating system. Other handheld mobile devices without built-in NFC chips may utilize MicroSD and UICC SIM cards incorporating industry standard contactless smartcard chips with ISO14443 interface, with or without built-in antenna.

The exemplary mobile device may also include card slots for removable or non-removable flash and SIM cards, and may have up to 32 GB of non-volatile internal memory. One or more of the flash and SIM cards and internal memory may comprise computer-readable storage media containing program instructions applicable for effecting the present system and method for vehicle tire and parts management. As generally known and understood in the art, the flash card is an electronic flash memory data storage device used for storing digital information. The card is small, re-recordable, and able to retain data without power. For example, Secure Digital (SD) is a non-volatile memory card format developed by the SD Card Association for use in portable devices. SD has an official maximum capacity of 2 GB, though some are available up to 4 GB.

The SIM card contains an integrated circuit that securely stores the service-subscriber key (IMSI) used to identify a subscriber on the Mobile Device. SIM hardware typically consists of a microprocessor, ROM, persistent (non-volatile) EEPROM or flash memory, volatile RAM, and a serial I/O interface. SIM software typically consists of an operating system, file system, and application programs. The SIM may incorporate the use of a SIM Toolkit (STK), which is an application programming interface (API) for securely loading applications (e.g., applets) or data to the SIM for storage in the SIM and execution by the Mobile Device. The STK allows a mobile operator (such as a wireless carrier) to create/provision services by loading them into the SIM without changing other elements of the Mobile Device. One convenient way for loading applications to the SIM is over-the-air (OTA) via the Short Message Service (SMS) protocol.

Secure data or application storage in a memory card or other device may be provided by a Secure Element (SE). The SE can be embedded in the logic circuitry of the Mobile Device (e.g., smartphone), can be installed in a SIM, or can be incorporated in a removable SD card (secure digital memory card), among other possible implementations. Depending on the type of Secure Element (SE) that hosts an applet, the features implemented by the applet may differ. Although an SE is typically Java Card compliant regardless of its form factor and usage, it may implement features or functions (included in the operating system and/or in libraries) that are specific to that type of SE. For example, a UICC (Universal Integrated Circuit Card) may implement features that are used for network communications, such as text messaging and STK, whereas in certain embedded SE devices, these features may not be implemented.

Additionally, to identify a user's Mobile Device, a unique serial number called International Mobile Equipment Identity, IMEI, may be assigned to the device. As known by persons skilled in the art, IMEI is standardized by ETSI and 3GPP, and mobile devices which do not follow these standards may not have an IMEI. The IMEI number is used by the network to identify valid mobile devices. IMEI identifies the device, not the user (the user is identified by an International Mobile Subscriber Identity, IMSI), by a 15-digit number and includes information about the source of the mobile device, the model, and serial number. Other features of the exemplary Mobile Device may include front-facing and rear-facing cameras, Dolby Digital 5.1 surround sound, video mirroring and video out support, built-in speaker and microphone, built-in 25-watt-hour rechargeable lithium-polymer battery, and sensors including three-axis gyro, accelerometer, and ambient light sensor.

The exemplary Mobile Device may also combine aGPS and other location services including WIFI Positioning System and cell-site triangulation, or hybrid positioning system. Mobile Phone Tracking tracks the current position of a mobile device, even when it is moving. To locate the device, it must emit at least the roaming signal to contact the next nearby antenna tower, but the process does not require an active call. GSM localization is then done by multilateration based on the signal strength to nearby antenna masts. Mobile positioning, which includes location based service that discloses the actual coordinates of a mobile device bearer, is a technology used by telecommunication companies to approximate where a mobile device, and thereby also its user (bearer), temporarily resides.

The exemplary Mobile Device may comprise BLUETOOTH, WIFI, and NFC technologies. BLUETOOTH and WIFI are similar to NFC in that all three technologies allow wireless communication and data exchange between digital devices like the present Mobile Device. NFC, however, utilizes electromagnetic radio fields while technologies such as BLUETOOTH and WIFI focus on radio transmissions. The present Mobile Device may comprise an active NFC device, enabling it to collect information from NFC tags and to exchange information with other compatible devices. The Mobile Device may also write information to NFC tags. To ensure security, NFC often establishes a secure channel and uses encryption when sending sensitive information.

In another aspect, the present disclosure comprises a method for logging and reporting driver activity and vehicle operation. The method includes identifying a driver of a vehicle and recording operating data. The operating data is recorded with an electronic on-board recorder that is hardwired to a data bus, for example, an engine control module, of the vehicle, coupled to a vehicle mileage sensing system, and linked to a global navigation satellite system. The operating data includes mileage obtained from at least one of the vehicle mileage sensing system and the vehicle data bus; engine use, time, and date obtained from the vehicle data bus; and location, time, and date obtained from the global navigation satellite system. The method includes recording a duty status of the driver. The duty status includes (a) off duty status, (b) sleeper berth status, (c) driving-on duty status, and (d) not driving-on duty status.

The method further includes creating an hours of service log from time, date, and duty status, the hours of service log including a change in duty status of the driver, time and date the change occurred, hours within each duty status, total hours driven today, total hours on duty for seven days, and total hours on duty for eight days; creating a fuel tax log from mileage obtained from the vehicle mileage sensing system, location obtained from the global navigation satellite system, time obtained from at least one of the vehicle data bus and the global navigation satellite system, and date obtained from at least one of the vehicle data bus and the global navigation satellite system, the fuel tax log including miles traveled between periodic recording intervals, and location, time, and date recorded at each periodic recording interval; comparing the driver's hours of service log to an applicable requirement, for example, law or regulation; indicating to the driver with the on-board recorder whether the driver is in-compliance or out-of-compliance with the applicable requirement; automatically uploading the hours of service log and the fuel tax log to a receiver external to the vehicle using a wireless telecommunications network; and emitting a compliance signal representative of whether the driver is in-compliance or out-of-compliance with the applicable requirement to a second receiver external to the vehicle and under control of authorities.

Embodiments of this aspect may include one or more of the following features.

The method includes identifying the driver of the vehicle by interfacing with a portable memory device, and importing a driver's hours of service log through the portable memory device or the wireless network. The portable memory device is, for example, a smart card or contact memory button. The method further includes verifying the identity of the driver of the vehicle using, for example, biometric verification, and enabling the vehicle to be started, moved, or engine idled in response to identifying the driver of the vehicle.

Recording operating data includes automatically recording the mileage from the vehicle mileage sensing system; the mileage, engine use, time, and date obtained from the vehicle data bus; and the location, time, and date obtained from the global navigation satellite system. Recording the duty status can include automatically determining a change in the duty status and at least one of the time, date and location of the change in the duty status from the operating data. Recording the duty status includes logging a change in the duty, status from a manual input by the driver.

The fuel tax log is used to create an IFTA (International Fuel Tax Agreement) compliant fuel tax report. The method includes manually inputting an indication of a border crossing.

When team driving, the method includes logging the duty status of a first driver of the vehicle with the on-board recorder; identifying a next driver of the vehicle with the on-board recorder; logging the duty status of the first driver and the next driver of the vehicle with the on-board recorder; and importing data for an hours of service log for the next driver into the on-board recorder from at least one of a portable memory device and a wireless telecommunications network. The fuel tax log can be created for a single vehicle having the first driver and the second driver.

The method includes calibrating mileage received from the vehicle mileage sensing system using data received from the global navigation satellite system or using vehicle tire size, and providing mileage from the recorder to an odometer display and to the vehicle data bus.

An exceptions report can be created from the comparison of the driver's hours of service log to the applicable requirement, and a cause of being out-of-compliance displayed to the driver.

The method includes encrypting the operating data, the hours of service log, the fuel tax log, and the compliance signal emitted from the recorder to ensure data integrity.

Operating data can be modified by a driver input and/or by a fleet carrier input, and any alterations of operating data recorded with a track changes function of the on-board recorder and/or on the host server.

The hours of service log can be displayed, for example, inside or outside the vehicle on an external display, as a graphical grid.

Automatically uploading includes uploading over a pager connection, a cellular telephone connection, a wide area network connection, an infrared connection, a radio connection, and/or a satellite connection. Automatically uploading includes uploading during an off-peak operating period, for example between 1:00 am and 5:00 am and/or on a weekend, for a wireless telecommunications network. Automatically uploading includes attempting to upload at least daily first over a least expensive connection and, if unsuccessful, then over at least one next least expensive connection, and uploading over a satellite connection when successive daily uploads are unsuccessful. Automatically uploading includes attempting to upload at least daily first over a predetermined wireless telecommunications network connection and, if unsuccessful, then over another predetermined wireless telecommunications network. Automatic uploading is an uploading of the current day, previous days, or day prior to the previous day hours of service and/or fuel tax logs.

The method includes uploading to the second receiver external to the vehicle when a compliance status check is requested by law enforcement, and/or when the vehicle is within a predetermined range of the second receiver. The second receiver is located, for example, on a handheld device, along a highway, at a weigh station, or within a law enforcement vehicle. The compliance signal is uploaded, for example, through a wired or wireless connection connected to a data port inside or outside of the vehicle.

The hours of service log is output to, for example, a display on the on-board recorder, a display on an external display device, the second receiver, or a wired connection connected to a data port inside or outside of the vehicle. The output of the hours of service log occurs responsive to a request from, for example, the driver, a fleet carrier, or the authorities. A data transfer and storage device can be placed in communication with the on-board recorder; and the hours of service log, fuel tax log, and the compliance signal uploaded to the data transfer and storage device.

The receiver to which the logs are automatically uploaded is, for example, a host server, and the fuel tax logs are uploaded from the host server to an external server that creates and files fuel tax reports.

In particular embodiments, the method may include notifying the driver if a particular event occurs, for example, notifying the driver to log into the recorder if the vehicle moves and the driver has not logged in, emitting an out-of-compliance signal if the driver is not logged in within a predetermined period, notifying the driver to log operating data on a paper log if the recorder is malfunctioning, and notifying a driver when the driver is nearing the end of an hours of service parameter. The driver can be notified by, for example, a text message, a visual indicator, and/or an audible signal. Compliance can be indicated by red, yellow, and green lights. A light on the recorder can be flashed when the driver is within a first predetermined time period of the end of the parameter, and another light on the recorder flashed when the driver is within another predetermined time period of the end of the parameter. The carrier can also be notified when the driver is nearing the end of a parameter. The method can also include emitting a signal indicating whether the recorder is present.

The method further includes, for example, the driver certifying the hours of service log prior to the automatic upload, and initiating a self-diagnostic function on the recorder upon a predetermined event. The predetermined event is at least one of a vehicle start, once in a 24-hour cycle, upon demand by law enforcement, and upon demand by the driver.

According to another aspect, a method for logging and reporting driver activity and vehicle operation includes recording only the following operating data mileage obtained from at least one of the vehicle mileage sensing system and the vehicle data bus; engine use, time, and date obtained from the vehicle data bus; and location, time, and date obtained from the global navigation satellite system.

According to another aspect, an on-board recorder for logging and reporting driver activity and vehicle operation includes a memory device configured to store operating data; a power supply; a first interface configured to connect to a vehicle mileage sensing system; a second interface configured to connect to an vehicle data bus of the vehicle; a receiver configured to link with a global navigation satellite system; at least one data portal configured to upload data from the memory device to a receiver external to the vehicle using a wireless telecommunications network, and supporting a connection with a receiver external to the vehicle and under control of authorities; a driver interface configured to record driver identification information input by a driver of the vehicle and duty status input by the driver; a processor operatively connected to the memory device for processing encoded instructions, recording operating data, and creating an hours of service log, a fuel tax log, and determining whether the driver is in compliance with an applicable requirement; and a display.

According to another aspect, a system for logging and reporting driver activity and vehicle operation includes an on-board recorder; wired connection between the on-board recorder and the vehicle data bus; a first server connected with the vehicle through the wireless telecommunications network, the on-board recorder being configured to automatically download the hours of service log, the fuel tax log, and the compliance signal; and a second server connected with the first server and configured to receive the fuel tax log, the second server including a computer readable media encoded with one or more computer programs for filing fuel tax reports based on the fuel tax log.

According to another aspect, a device for logging and reporting driver activity and vehicle operation includes one or more of the following means: means for identifying a driver of a vehicle and recording operating data; means for recording a duty status of the driver; means for creating an hours of service log; means for creating a fuel tax log; means for comparing the driver's hours of service log to an applicable requirement; means for indicating to the driver with the on-board recorder whether the driver is in-compliance or out-of-compliance with the applicable requirement; means for automatically uploading the hours of service log and the fuel tax log to a receiver external to the vehicle; and means for emitting a compliance signal representative of whether the driver is in-compliance or out-of-compliance with the applicable governmental reporting requirement to a second receiver external to the vehicle and under control of authorities.

According to another aspect, a method includes one or more of the following and/or an apparatus includes one or more of the following means for: identifying one or more drivers of a vehicle; verifying the identity of the one or more drivers by at least one of biometric and visual means; determining driver hours of service for more than one driver concurrently; recording driver hours of service for more than one driver concurrently; uploading data via a least cost method over a wireless telecommunications network; uploading through the recorder, via a wireless telecommunications network, driver identity, whether or not verified; identifying a driver, tying identity information to a driver record, determining driver hours of service, recording hours of service, uploading hours of service via a wireless telecommunications network, and optionally verifying identity information and optionally tying verification information to the driver record.

According to another aspect, a method includes one or more of the following and/or an apparatus includes one or more of the following means for: determining miles driven by a vehicle; recording miles driven by a vehicle; determining at least one of present and past location of a vehicle within a jurisdiction; determining at least one of present and past location of a vehicle between jurisdictions; determining border crossings between jurisdictions; recording at least one of present and past location of a vehicle within a jurisdiction; recording at least one of present and past location of a vehicle within two or more jurisdictions; recording border crossings between jurisdictions; uploading via a wireless telecommunications network at least one of present and past location of a vehicle within a jurisdiction; uploading via a wireless telecommunications network at least one of present and past location of a vehicle within two or more jurisdictions; uploading via a wireless telecommunications network border crossings between jurisdictions; and uploading via a least cost method over a wireless telecommunications network at least one of present and past location of a vehicle within a jurisdiction, at least one of present and past location of a vehicle within two or more jurisdictions, and/or border crossings between jurisdictions.

According to another aspect, a method includes one or more of the following and/or an apparatus includes one or more of the following means for: calculating, for example, periodically, when interrogated by authorities, or continuously, whether or not a driver is driving within parameters established by at least one of law(s) or regulation(s); wirelessly notifying, signaling, alerting or informing authorities that a driver is not in compliance with applicable hours of service laws or regulations; transmitting driver hours of service data to law enforcement via at least one of a wired connection, portable memory device and wirelessly, displaying data residing on the recorder via at least one of a wired connection, portable memory device and wirelessly, displaying remaining time for driver hours of service in at least one duty status generated from the recorder; exchanging data between the recorder and devices used to pump fuel into a vehicle; determining a driver's hours of service in compliance with home country and country of operation laws and regulations determining more than one driver's hours of service concurrently in compliance with home country and country of operation laws and regulations; and displaying hours of service data in any one or more languages.

According to another aspect, a method includes one or more of the following and/or an apparatus includes one or more of the following means for: identifying the location at which a trailer is at least one of tethered or un-tethered from a vehicle; recording the location at which a trailer is at least one of tethered or un-tethered from a vehicle; uploading the location at which a trailer is at least one of tethered or un-tethered from a vehicle; identifying the location of a trailer tethered to a vehicle; recording the location of a trailer tethered to a vehicle; and uploading the location of a trailer tethered to a vehicle.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Exemplary embodiments of the present disclosure will hereinafter be described in conjunction with the following drawing figures, wherein like numerals denote like elements, and wherein.

Figure 1:
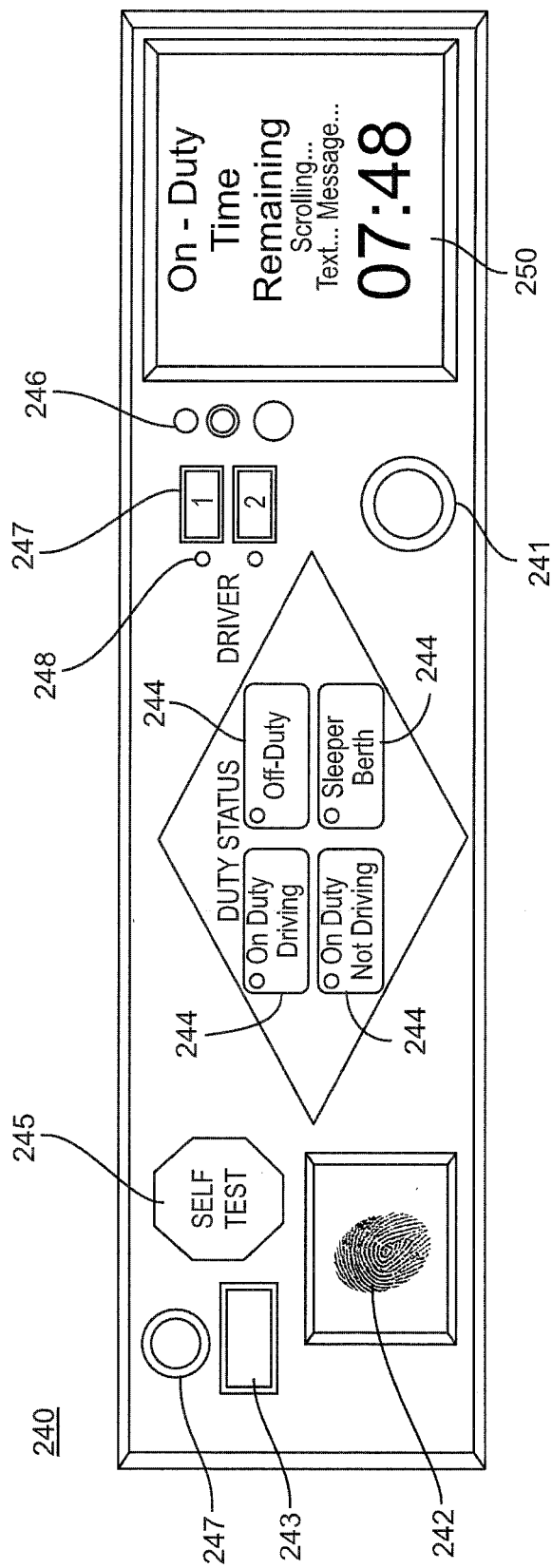
FIG. 1 is a front view of a display of an on-board recorder.

DESCRIPTION OF EXEMPLARY
EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Referring now specifically to the drawings, the present disclosure comprises exemplary systems, methods and apparatus capable of logging driver activity and vehicle operating data, creating reports from the data containing information required to comply with HOS regulations and IFTA fuel tax reporting, and emitting a signal indicating whether the driver is in-compliance or out-of-compliance with applicable HOS laws or regulations. In other exemplary embodiments, the disclosure comprises systems, methods, and apparatus for automated at-the-pump management of vehicle fuel purchases. In still further embodiments, the disclosure comprises systems, methods, and apparatus for diagnosing and managing vehicle faults.

I. System and Method for Logging Driver Activity and Vehicle Operation

Figure 2:
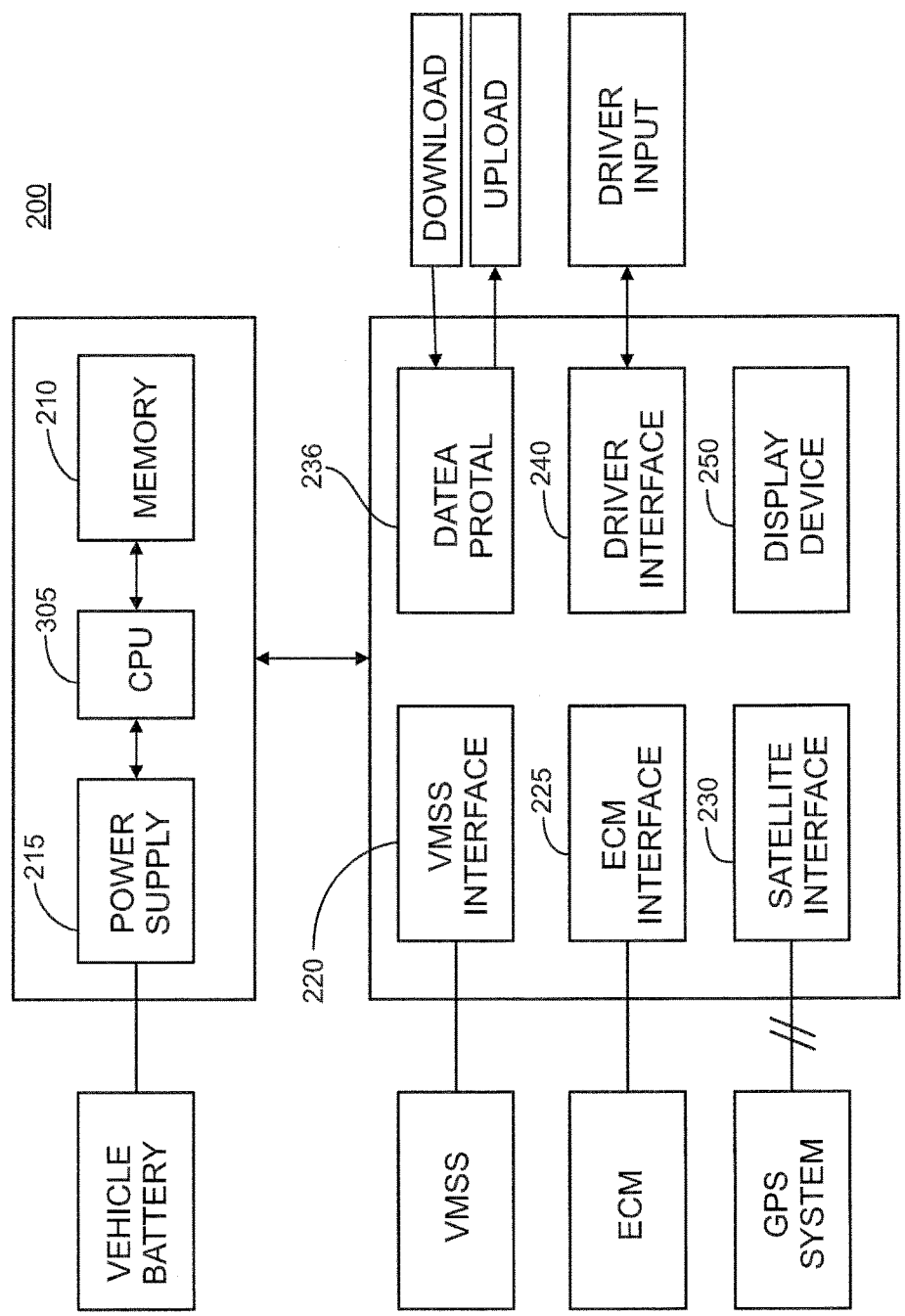
FIG. 2 is a schematic view of the on-board recorder.

Referring to FIGS. 1 and 2, an on-board recorder 200 includes various inputs and outputs for interfacing with a driver of the vehicle, a host server (typically located at the fleet carrier), authorities, a vehicle mileage sensing system, for example, a speed sensor (such as a magnetic pickup) and vehicle odometer sensor display of the vehicle, a data bus of the vehicle, for example, the vehicle engine control module (ECM), and a global navigation satellite system. The driver communicates with recorder 200 via a driver interface 240 permitting data input and interaction with the driver through the use of a portable memory device reader 241, and duty status buttons 244.

Recorder 200 includes a front panel 240 having a display screen 250, for example, a scrolling text message bar, for displaying text messages to the driver, a portable memory device reader 241, such as a contact memory button reader or smart card reader, to permit logging-in and logging-out of the driver from recorder 200 as well as transfer of prior driver activity to and from recorder 200, and duty status buttons 244 permitting the driver to manually change the driver's duty status, i.e., "on-duty driving," "off-duty," "on-duty, not driving," or "sleeper berth."

Front panel 240 has a self-test button 245 that allows the driver to initiate testing of the operability of recorder 200, and an indicator light 246, 248, such as an LED light, that indicates proper or improper operation of recorder 200 and/or the driver that is currently driving when team driving. Additional indicating lights 246 provide a visual indication of whether the driver's hours of service is in compliance or out-of-compliance with applicable hours of service regulations, for example, a red light indicates out-of-compliance, a green light indicates in-compliance, and a yellow light indicates that the driver is approaching the end of permitted driving time. Additionally or alternatively, compliance information can be conveyed to the driver audibly and/or on display screen 250. Front panel 240 also includes either or both of on-duty time remaining and a scrolling text message bar on display 250. Driver buttons 247 permit recorder 200 to switch the display between the drivers driving.

The front panel 240 of the driver interface includes optional biometric reading device(s) 242, 249, for example, a fingerprint recognition reader 242 and a camera 249. Recorder 200 also includes a wired data port 243, such as a USB port, to permit data transfer between the recorder 200 and other external devices or media, such as an electronic display (shown in FIG. 7).

Recorder 200 continuously obtains mileage from the vehicle mileage sensing system through a mileage sensing system interface 220, as well as mileage, engine use, miles driven, time and date obtained from the ECM through an ECM interface 225. Vehicle location (latitude and longitude), date, and time are input to recorder 200 from a global navigation satellite system, e.g., GPS, via a satellite interface 230 periodically, such as every fifteen minutes. In addition, a wireless data portal 235 is provided to permit the uploading and downloading of data from and to recorder 200.

On-board recorder 200 includes a back-up power supply 215, for example, an internal battery, processor 205, and a memory device 210. Primary power to on-board recorder 200 is provided by a connection to the vehicle battery. The processor 205 is, for example, a central processing unit (CPU) or a simpler data storage device utilizing encoded and encrypted instructions with processing capabilities in accordance with the available memory 210. The memory device 210 includes read and write capabilities and a variety of commercial, off the shelf memory media. The processor 205 and memory 210 collectively form the logic component of the recorder 200. Recorder 200 includes a display 250 for informing the driver of the remaining driving time permitted by the HOS laws or regulations, and for displaying relevant information to federal, national, state, provincial or local authorities, as discussed below.

Figure 3:
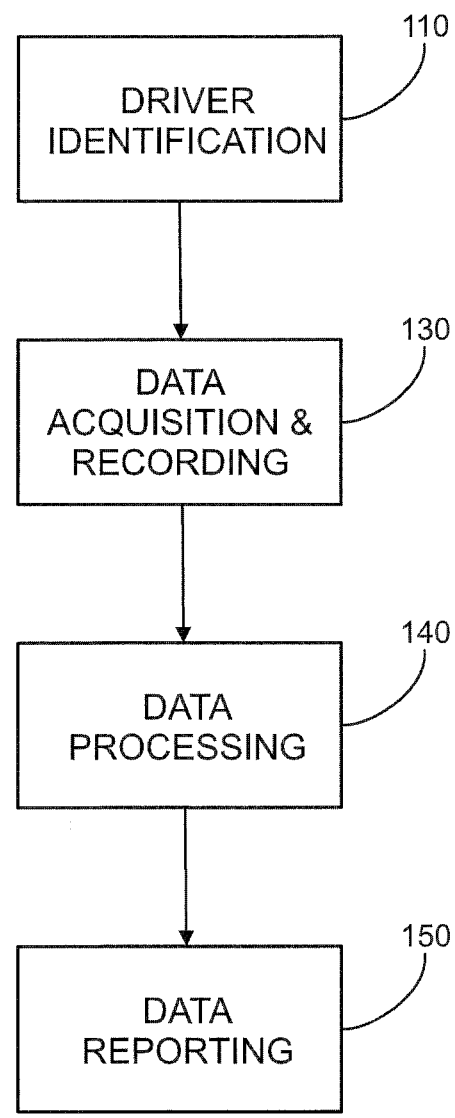
FIG. 3 is a flowchart of a system and method for logging and reporting driver and vehicle operating data.

Referring to FIG. 3, a process 100 for logging and reporting driver activity and vehicle operating data includes driver identification 110, data acquisition and recording 130, data processing 140, and data reporting 150. On-board recorder 200 is always powered on. Recorder 200 can automatically enter a "sleep mode" in which non-essential systems such as the display screen are powered down to conserve power, and the driver can awaken recorder 200 by pushing any key, or recorder 200 can be awakened by starting the vehicle or if the vehicle moves. The ability of the driver to cause the unit to go into sleep mode or to power-off can be limited or prevented. The identity of the driver is determined by the use of a unique driver ID, for example, a portable memory device issued to the operator and operable with a portable memory device reader 241, such as a smart card or contact memory button. The ability to start, move, or disable the vehicle can be controlled by or contingent upon an accurate identification of the driver.

Figure 4:
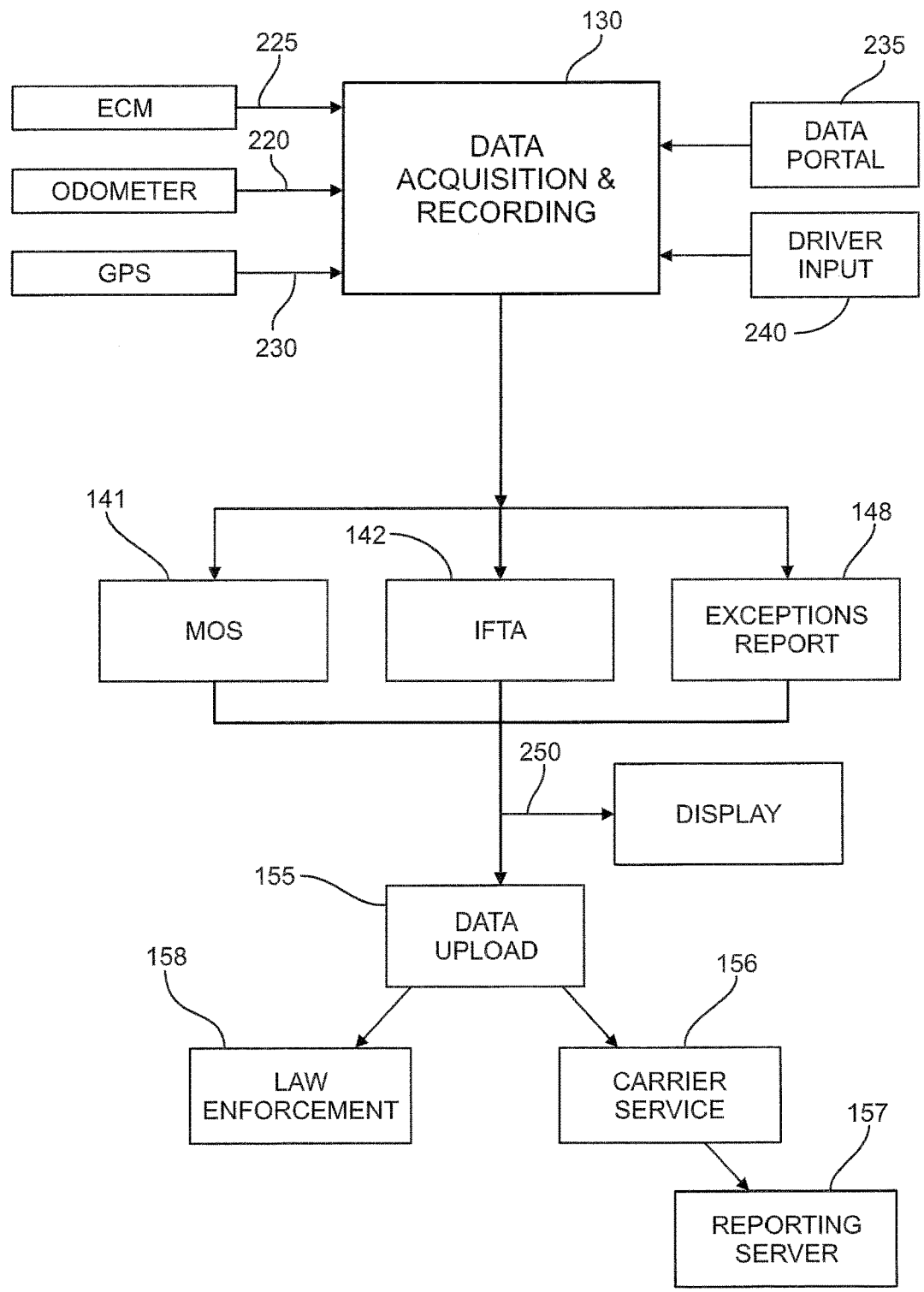
FIG. 4 is a flowchart of processing steps for logging and reporting driver and vehicle operating data.

Referring to FIG. 4, data acquisition and recording 130 encompasses acquiring data from the vehicle mileage sensing system, the vehicle ECM, GPS, driver input, and data portal 235. The on-board recorder 200 is connected to the ECM of the vehicle through a data bus, such as an SAE J1708, J1850 or J1939 data bus connected through the ECM interface 225. The data on the bus is translated into an RS232 signal via a commercial off-the-shelf data translator and fed into the on-board recorder processor 205 and memory 210. The vehicle mileage sensing system interface 220 is formed, for example, by hard-wiring on-board recorder 200 to the vehicle's magnetic speed sensor. Recorder 200 includes a Global Positioning System (GPS) receiver which forms satellite interface 230 and derives its input signal from an antenna located on the interior or exterior of the vehicle.

Mileage can be determined from only the ECM or through a broadcasting of an odometer reading from a vehicle dashboard, such as on a SAE J 1708 MID 140 bus. Alternatively, data received from the vehicle mileage sensing system, such as a speed sensor positioned at the transmission tail shaft of a vehicle can be automatically calibrated, for example, by comparing the data to mileage determined from GPS or through GPS mapping from a central server. The device can be automatically re-calibrated, by programming recorder 200 with the size and wear of the vehicle's tires and/or for different gear ratios. Recorder 200 can then provide the calibrated mileage to at least one of the odometer display and the ECM. Vehicle mileage can also be calibrated by using the GPS mapping at the central server and then sending the calibration back to the vehicle.

Recorder 200 automatically, continuously records the vehicle operating data as raw vehicle operating data obtained from the vehicle mileage sensing system and the ECM, and records GPS data at a set period time, for example, every fifteen minutes. GPS data can also be recorded upon the detection of a specific event, such as a change in duty status, or operating parameter, such as the engine being off for more than a specified period of time. To determine the hours of service, the driver's duty status throughout the day is also determined. Duty status includes driving-on duty, not driving-on duty, off duty, and sleeper berth. Each change in duty status can be manually input to recorder 200 by the driver using duty status buttons 244 and recorded with a time and date stamp obtained via GPS. Certain changes in duty status can also be determined automatically by recorder 200, as discussed below.

Data processing 140 creates an HOS log 141 and an IFTA log 142 from the raw data, and compares the HOS log to applicable regulations to determine whether the driver is in-compliance with HOS regulations. A more detailed exceptions report can be created from the comparison of the HOS log to applicable regulations that provide the detail of the comparison. In creating the HOS log, recorder 200 continuously calculates the time the driver has been in each duty status over the course of a day. The HOS log includes the time per duty status for eight consecutive days, including a calculation of the total hours driven today, total hours on duty for the past seven days, and total hours on duty for the past eight days. The hours of service log is typically created from date, time, mileage and duty status.

In creating the IFTA log, at every acquisition of data from GPS, for example, every fifteen minutes, the miles driven over that time period are calculated from mileage data obtained from the vehicle mileage sensing system and/or ECM, and recorded with a location, time, and date stamp obtained from the GPS data. A fuel tax report is then created, preferably by an external server, such as the host server or a second server communicating with the host server, having the requisite software to create a report in compliance with IFTA regulations, from the IFTA log and any required fuel purchase information.

Data processing 140 can also include an automatic determination of change in duty status from off-duty to driving on-duty. By recording the time when the vehicle starts to move, as determined by the ECM indicating engine use, i.e., that the vehicle has been started, and by the vehicle mileage sensing system or ECM indicating motion, recorder 200 automatically records a change of duty status to driving-on duty at that time. By recording the time when the engine is turned off for a predetermined period, such as four minutes, recorder 200 automatically prompts the driver to input a change of duty status to not driving-on duty, off duty, or sleeper berth. Also, by recording the time when the engine remains on but the vehicle is not moving (determined from, for example, either a speed of zero obtained from the ECM or there being no change in mileage) for a predetermined period, such as four minutes, recorder 200 can automatically prompt the driver to input a change of duty status to not driving-on duty, off duty, or sleeper berth. Off duty status is automatically determined at the time the driver logs out from recorder 200, for example, by removing the smart card from smart card reader 241. Alternatively, the driver can use the keys to indicate off-duty status while leaving the card in the reader.

Data reporting 150 includes using recorder 200 to provide information to the driver, as discussed above, displaying on display device 250 the hours of service log and compliance status, with display 250 and indicator lights 246. An additional display tablet can be connected to recorder 200 to display the hours of service log in grid form. For example, operator's total hours driven today, total hours on duty today, total miles driven today, total hours on duty for seven days, total hours on duty for eight days, and the operator's changes in duty status and the times the changes occurred are displayed.

Data reporting 150 also encompasses the ability of system 100 to automatically upload the hours of service log and the fuel tax log to a receiver external to the vehicle using a wireless telecommunications network. Recorder 200 also emits, such as periodically or continuously, a signal representative of the compliance status to a second receiver external to the vehicle and under control of authorities, such as law enforcement, carrier management, regulatory agencies or other approved inspector or agent. In addition, the compliance status, HOS logs or a more detailed exceptions report can be uploaded to a second receiver external to the vehicle when recorder 200 is queried.

Recorder 200 is configured to automatically attempt to transmit data to a host server via the wireless telecommunications network's off-peak hours, e.g., at a pre-determined period of time (e.g., 1:00 am-5:00 am) that is selected because it is available at low cost. A wireless telecommunications network made up of pager networks, cell phone networks and wide area networks provides low cost options. Other options are an infrared connection, a radio connection, and a satellite connection. Recorder 200 is programmed to seek a single wireless telecommunications network to upload data to a host server. Alternatively, recorder 200 can be programmed to seek various wireless telecommunications networks to upload data to a host server, from the least cost to the next most expensive cost and so on until the device finds such a data link and uploads its data. If after a predetermined time period for performing an upload, such as fourteen days, upload has not been successful, each day's HOS log, and IFTA log, and alternatively an exceptions report as well, can be uploaded whenever the recorder comes into contact with the predetermined method of uploading data, or can be uploaded over a satellite connection. Data is stored on recorder 200 for not less than 14 consecutive days and is organized by driver for hours of service purposes and/or by vehicle for fuel tax reporting purposes.

By continuously emitting a signal indicating the compliance status of the driver, recorder 200 provides a way whereby authorized federal, state or local officials can immediately check the status of a driver's hours of service. Authorities receive this signal whenever the vehicle is within a predetermined range of the second receiver located, for example in a hand-held device, law enforcement vehicle, weigh station, or along a highway. The entire hours of service log can be displayed on recorder 200 or on an electronic display or tablet connected thereto, or downloaded, when recorder 200 is queried. Data can be downloaded to law enforcement personnel using a receiver tied to a computer, for example; in the law enforcement vehicle, that wirelessly interrogates recorder 200 and displays the data, by using a handheld device in the possession of a law enforcement officer that wirelessly interrogates recorder 200 and displays the data, or by using a wired connection through a port inside or outside of the vehicle.

The capability can also be provided to download information from a host server to the recorder. For example, using the communication link by which data is downloaded to the host server, the host server can also communicate data to recorder 200 at the end of the daily upload cycle. Data transmitted can include driver regime, such as 7 day/60 hour or 8 day/70 hour regime. The host server can also communicate with recorder 200 as desired via a wireless telecommunications network to ascertain information, such as compliance status, location as of the last GPS recording and remaining HOS.

Figure 5:
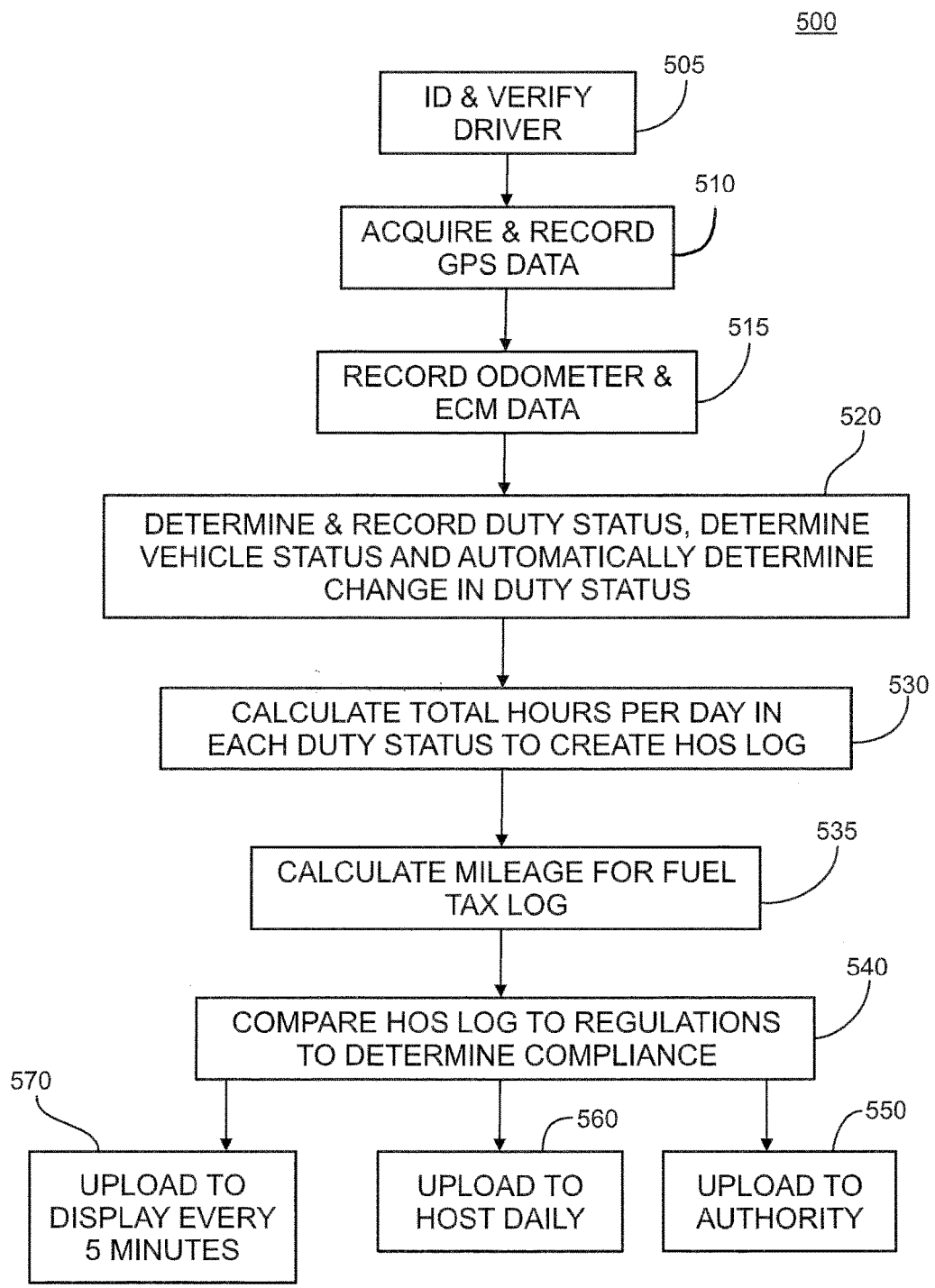
FIG. 5 is a flowchart of processing steps for logging and reporting driver and vehicle operating data.

Referring to FIG. 5, the overall process includes driver and vehicle identification and verification 505, acquiring and recording GPS data at pre-determined intervals, for example, every 15 minutes 510, acquiring mileage and ECM data, for example, continuously, recording mileage and ECM data, for example, at least every 15 minutes, 515, determining duty status from driver input and/or automatically and recording duty status 520, calculating total hours per day in each duty status to create an HOS log 530, recording latitude and longitude for fuel tax reporting 535, comparing the HOS log to regulations to determine compliance, uploading compliance status or a detailed exceptions report to federal, national, state, provincial or local authorities 550 continuously, periodically or upon receipt of authority's or driver request, uploading to the host server 560, for example, daily, and uploading to the recorder display 570, for example, every five minutes.

Recorder 200 automatically records data formatted to meet home country legal requirements and country of operation legal requirements. For example, a driver whose home country is Mexico, may operate a vehicle over a period of time in the United States. The operation of the vehicle within these countries, and their respective states, provincial or local jurisdictions triggers different reporting requirements to comply with respective HOS laws or regulations. Recorder 200 simultaneously records hours of service and/or fuel tax information that is country-specific, such as for the United States, Canada, and Mexico, and has multi-lingual reporting capability, such as English, French and/or Spanish.

Figure 6:
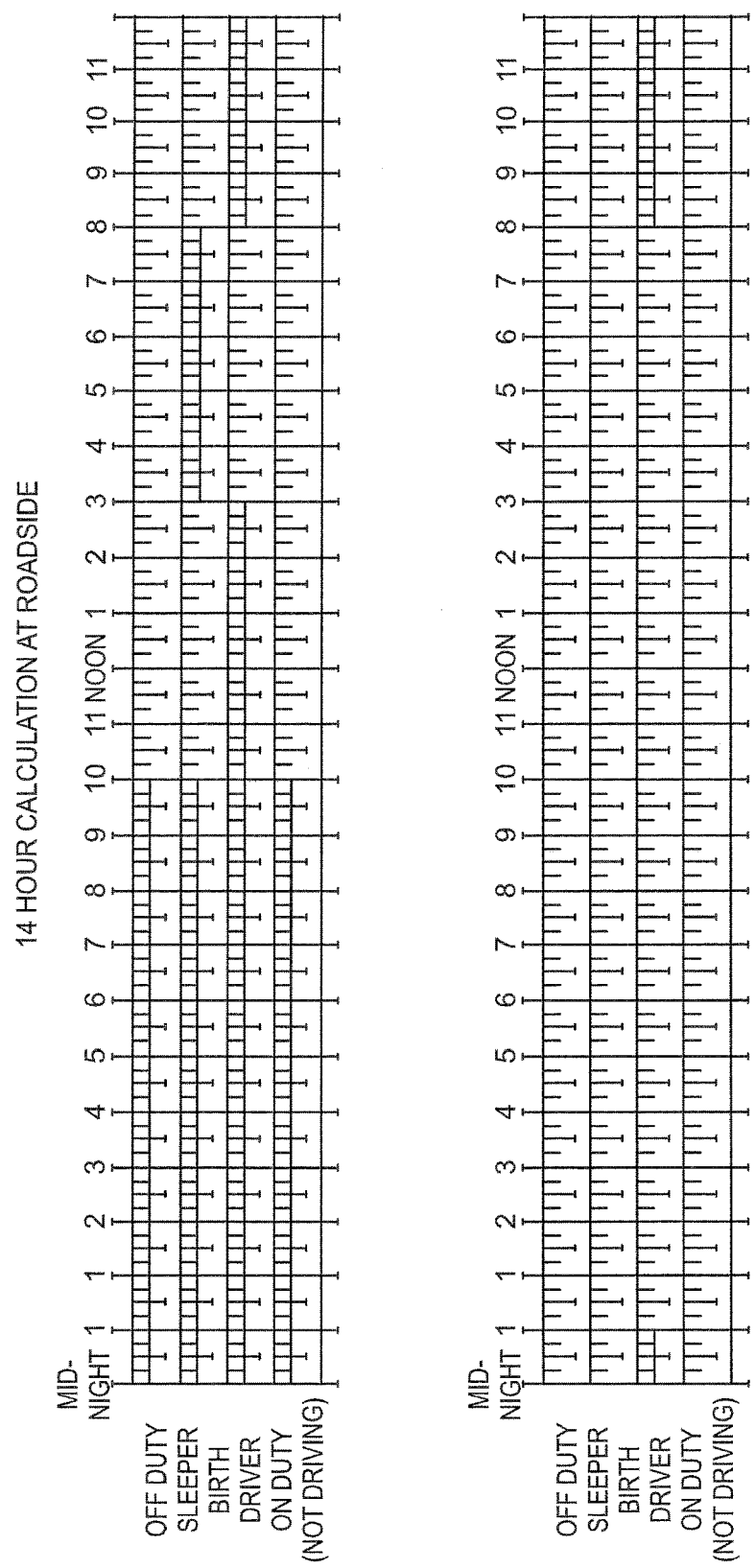
FIG. 6 is a graphical view of an hours-of-service log generated by the on-board recorder.

As seen in FIG. 6, a graphical representation of an hours of service log includes duty status (off-duty, sleeper berth, driving, and on duty-not driving) on the vertical axis, and hours of the day on the horizontal axis. The log line indicates each change in duty status, the time the change occurred, and the hours within each duty status between changes. In the example shown for Day 1, the driver was in "off duty" status for 10 hours (midnight to 10 am on Day 1), followed by five hours of on "duty-driving" (10 am to 3 pm on Day 1), followed by a "sleeper berth" period of five hours (3 pm to 8 pm). The driver was then back on duty "driving" for another five hours (8 pm to 1 am on Day 2) when the driver was pulled over for a routine roadside inspection or weigh station. In this situation, the driver was in compliance with the hours of service regulations. Accordingly, a signal representing a compliance status (in-compliance state) would have been emitted by the on-board recorder during the inspection. The law enforcement officer would have known before inspecting the hours of service log shown in FIG. 6 that the driver was already in compliance.

Figure 7:
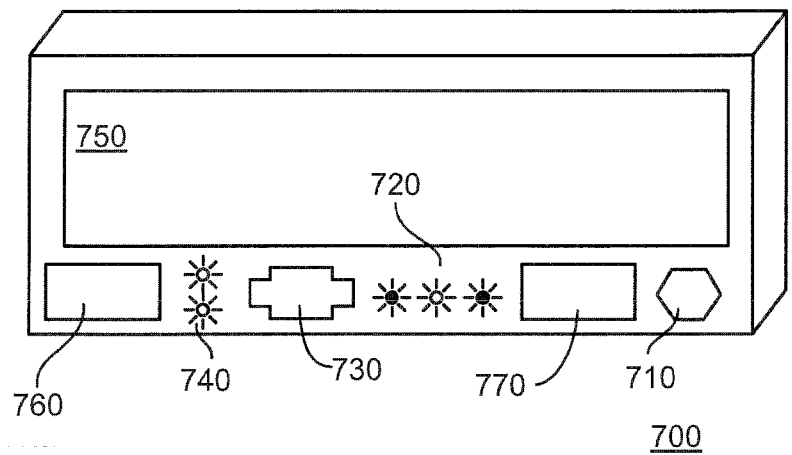
FIG. 7 is a front view of a display external to the recorder.

A complete display of an hours of service log can provide eight such graphical representations, one for each of the eight days, and a summary of the total hours driven today, total hours on duty for seven days and total hours on duty for eight days. As seen in FIG. 7. the hours of service log shown in FIG. 6 can be displayed separately from recorder 200. For example, an external display device 700 is connected to recorder 200 to provide a more detailed review of recorded data. External display device 700, such as an electronic tablet connected wirelessly or through a wired connection such as a USB connection with recorder 200, has a relatively large display 750 for viewing detailed HOS logs (see FIG. 6) that are not as easily viewed on the display 250 of recorder 200. The external display device 700 includes a device functioning indicator 710, compliance status indicators 720, a home or operating country selector 730, driver selectors or indicators 740, a duty status selector 760 and a data transmission port 770, such as a USB connection or wireless transceiver for wirelessly communicating with recorder 200.

Figure 8:
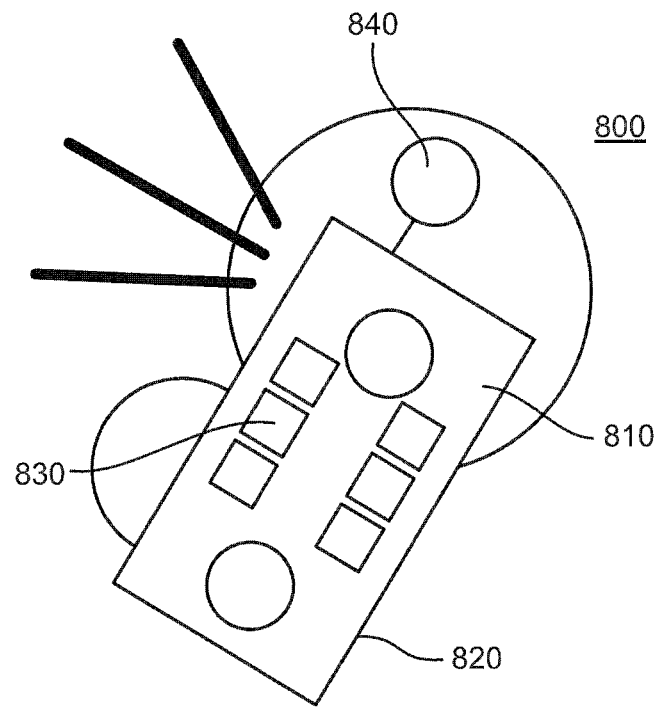
FIG. 8 is a schematic view of a device for receiving a signal indicating compliance status of a driver or vehicle.

Referring to FIG. 8, a device 800 for receiving a signal indicating a compliance status of a driver or vehicle has an "in-compliance" indicator 810, an "out-of-compliance" indicator 820, an input/keypad 830, and a receiver 840 for receiving emitted compliance status signals from nearby recorders 200. Device 800 can be powered from a law enforcement officer's vehicle (such as plugged into a cigarette lighter), or battery, and can be a handheld device that is used to monitor passing and nearby vehicles for HOS compliance status. Recorder 200 can have a short range RF transmitter which broadcasts the driver's HOS compliance status, electronic vehicle license plate, drivers risk factor based oh past records, etc. The receiver can be an RF receiver distributed to state, local, and federal authorities providing snapshot monitoring of the status of drivers (HOS compliant or non-compliant), high risk drivers and vehicles at toll gates and border crossings.

A number of embodiments of the invention have been described. Nevertheless, it will be understood that various modifications may be made without departing from the spirit and scope of the invention. For example, the on-board recorder may be configured to include one or more of the following features.

Recorder 200 can include a biometric reader for verifying the identity of the driver using, for example, facial, retinal or thumbprint recognition. The identity data is compared to a database within recorder 200 to verify the identity of the driver by matching the biometric with a specific driver. The unique driver ID can be a Transportation Worker Identification Card (TWIC) currently being developed by the Transportation Security Administration (TSA) or a commercial driver's license (CDL) issued by various state or federal governments. The vehicle can be disabled if the identity of the driver cannot be verified after some predetermined time.

Camera 249 can be a miniature camera, such as with IR lighting for night driving, positioned on the front face of recorder 200 for visual analyzing the driver. The camera is used to identify the driver and visually tie the driver to the HOS data. Facial recognition, retinal or IRIS mapping, and driver behavior can be periodically assessed such as for drowsy driver syndrome from the recorder or an external source, such as through an external host server. The digital camera feature can be used for gate authorization by sending the drivers' ID and photograph ahead to a destination, such as a shipping dock or border crossing. The camera feature can be used for on-board documentation to the central server. Once the vehicle is in the non-moving and park mode the digital camera can also be used as a FAX/Scanner.

The portable memory device carried by the driver, for example, the smart card or contact memory button (such as the IBUTTON® device available from Maxim Integrated Products, Inc. of Sunnyvale, Calif.), can be configured to retain driver identity data, driving regime (such as, 7 day or 8 day regime), and the driver's hours of service log such that this information is automatically downloaded from the portable memory device to recorder 200 whenever a driver logs into a vehicle. In this way, the driver's hours of service log and related information can be transferred from one vehicle to another as the driver changes vehicle. Such data can also be downloaded into recorder 200 from the fleet carrier via several methods, for example, a wired connection at the fleet terminal, a wireless connection at the fleet terminal and/or a wireless download at any location within the range of a wireless telecommunications network. The portable memory device can include a programmable logic controller, such as an electrically erasable, programmable, read-only memory (EEPROM) of flash EEPROM.

Additional information that can be stored on the portable memory device includes the driver's current driving regime, the commercial driver license number (CDL #), commercial driver endorsements (e.g., HAZMAT), traffic violations and high risk driver data (e.g., DWI convictions). Transactions such as the last vehicle driven can also be stored on the driver card. Portable memory device technology, such as the IBUTTON®, can be used to transfer fuel purchase information about the vehicle and/or driver to a fuel pump and/or from the fuel pump to recorder 200. Alternatively, or in combination, infrared and RFID technology can be used to transfer data to and from recorder 200 to a user ID card or other external data source.

Recorder 200 can separately record each driver's duty status when more than one driver is driving the vehicle, for example team driving. While the hours of service for a particular driver are transferred, for example, by a wireless telecommunications network connection or portable memory device, when the driver moves to a new vehicle, the IFTA logs, which are vehicle dependent, remain with the recorder on the old vehicle.

IFTA reports identify the miles driven in each jurisdiction. Border crossings, for example, between states, countries, and provinces, can be determined by the driver inputting to recorder 200 when a border is crossed, by mapping software on an external server, or by mapping software on recorder 200. Recorder 200 can emit a signal indicating whether the recorder is present and thus recording data for compliance with applicable IFTA laws or regulations, and can emit safety related information such as tire pressure.

For each change of duty status, whether input manually or determined automatically, location as determined by GPS can be recorded. If a vehicle is equipped with an Intelligent Dash Board with speedometer, on dash odometer and fuel gage 225, data can be collected by recorder 200 from the Intelligent Dash Board rather than through the vehicle mileage sensing system interface 220.

The data processing 140 and data reporting 150 sections can also provide the capability of data encryption to ensure data integrity and to prevent tampering by the vehicle operator. However, the driver and/or carrier can be permitted to modify the operating data, and the processor includes a track changes function that records any alterations of operating data. Recording 200 can also provide the capability of authenticating the recipient of data such that data is only available to authorized users.

Recorder 200 can prompt the driver to review and verify that all entries are accurate prior to uploading data to the carrier. Recorder 200 can further prompt the driver to certify that all entries made by the driver are true and correct or that recorder 200 is operating properly. If recorder 200 malfunctions, the recorder can notify the driver visually, audibly and/or using a text message, prompt the driver to revert to a paper log, and/or emit an out-of-compliance signal. If recorder 200 determines that the vehicle is moving but no driver is logged on, a visual/audio/or text warning is provided to the driver signaling that the driver is not logged-in, and an out-of-compliance signal is emitted. Recorder 200 can also warn the driver when the driver is approaching the maximum limitations established by the hours of service laws or regulations. Recorder 200 can also upload such a warning to the carrier.

To limit "double counting," whereby a driver uses a paper log book when recorder 200 is on-board, recorder 200 can emit a signal indicating that recorder 200 is on-board the vehicle. Recorder 200 has logic built in to account for, for example, gaps in miles or time to ensure the driver does not tamper with recorder 200, such as by disconnecting the power source, pulling a fuse, or similar tampering.

Recorder 200 continually or periodically performs self-testing and can prompt the driver to troubleshoot for system errors and system rebooting. Recorder 200 can self-test upon demand from law enforcement.

WIFI or BLUETOOTH technology can be utilized to facilitate data transfer and/or permit the communication of many different devices to form a communication network. BLUETOOTH technology can be used to permit the downloading of fuel purchase information to recorder 200 and/or as the communication protocol for the recorder itself in communications with law enforcement or any other data transfer.

Recorder 200 can have a short range RF transmitter which broadcasts the driver's HOS compliance status, electronic vehicle license plate, driver's risk factor based on past records, etc. The receiver can be an RF receiver distributed to state, local, and federal authorities for a snapshot monitoring status of drivers (HOS compliant or non compliant) high risk drivers and vehicles at toll gates and border crossings, and for Homeland Security purposes generally. The receiver can plug into the cigarette lighter of the law enforcement vehicle, similar power source or be positioned within a handheld device. A non-compliant driver can be identified by recorder 200 emitting short range signals, such as 315 MHZ or 434 MHZ (approximately 200 ft) RF signals, which can be detected by authorities. The receiver held by authorities can be a 315 MHZ or 434 MHZ RF device. The data exchange is dependent upon an authentication process, whereby only authorized users (the authorities) can access the data. The authorities can then be alerted while driving past a vehicle on the highway or when sitting along an interstate and monitoring for violators. Once a violation has been detected the authorities can obtain a detailed log from the recorder via a hard connection or a wireless connection, such as BLUETOOTH or WIFI adapter in the USB data port of recorder 200. Also the non compliant driver status can be broadcasted on the SAE J1708/1587 data bus and the RS-232 port from the recorder. As another method the RS-232 and/or SAE J1708 data can allow existing telecommunication products on the vehicle such as QUALCOMM®, XATA® and PEOPLENET® to transmit the driver log report status. Also, as another method the RS232, SAE J1708 or USB data port can allow the driver logs to be downloaded via WIFI or BLUETOOTH adapters or devices at WIFI hot spots at truck stops, for example, SIRICOMM has incorporated WIFI hot spots at Pilot Service Centers, and WIFI Hot(s) Networks are planned at weigh stations, toll gates, and Fleet Terminals.

Vehicles emitting an in-compliance signal can pass through a checkpoint or roadside inspection without further delay and those that are not in-compliance can be stopped for further investigation. Recorder 200 can be queried to generate a driver's hours of service graph and display the graph, for example, on a display tablet that can be connected to recorder 200. Electronic tablet 700 can be equipped with a rechargeable battery, such as a NiCd battery or a standard NiCad battery pack used on video cameras. The electronic tablet device 700 can include an antenna for all types of wireless communication and a connection permitting wired communication. The electronic tablet 700 can include a USB port so that printers and other devices can communicate to the electronic table 700. The recorder can be provided with a USB Port to form a direct, non-wireless connection to the tablet.

Recorder 200 can also be provided with the option of detecting whether or not a trailer is tethered to the vehicle. If tethered, recorder 200 connects to a PLC chip located in the trailer from the ABS Trailer Module that contains the trailer's ID number and related data and a PLC receiver chip located in the recorder. The trailer ID information can be obtained from various sources, for example, via a PLC4Trucks power line communications, such as defined in SAE J2497. If the fleet operator wants to locate that particular trailer it can access the PLC network chip via cell or pager network, or via satellite, through recorder 200.

The Recorder 200 can be equipped with a Tractor PLC ID transmitter chip and the driver log information can be downloaded from a Trailer Tracking System, such as TERION®, using a SAE J 2497 power line communication protocol. This method allows the driver's log report along with a tractor ID to be sent through an existing power line, for example, using a standard SAE J560 tractor/trailer connector and SAE J2497 protocol to a trailer communication wireless product.

II. Automated at-the-Pump Management of Vehicle Fuel Purchases

Figure 9:
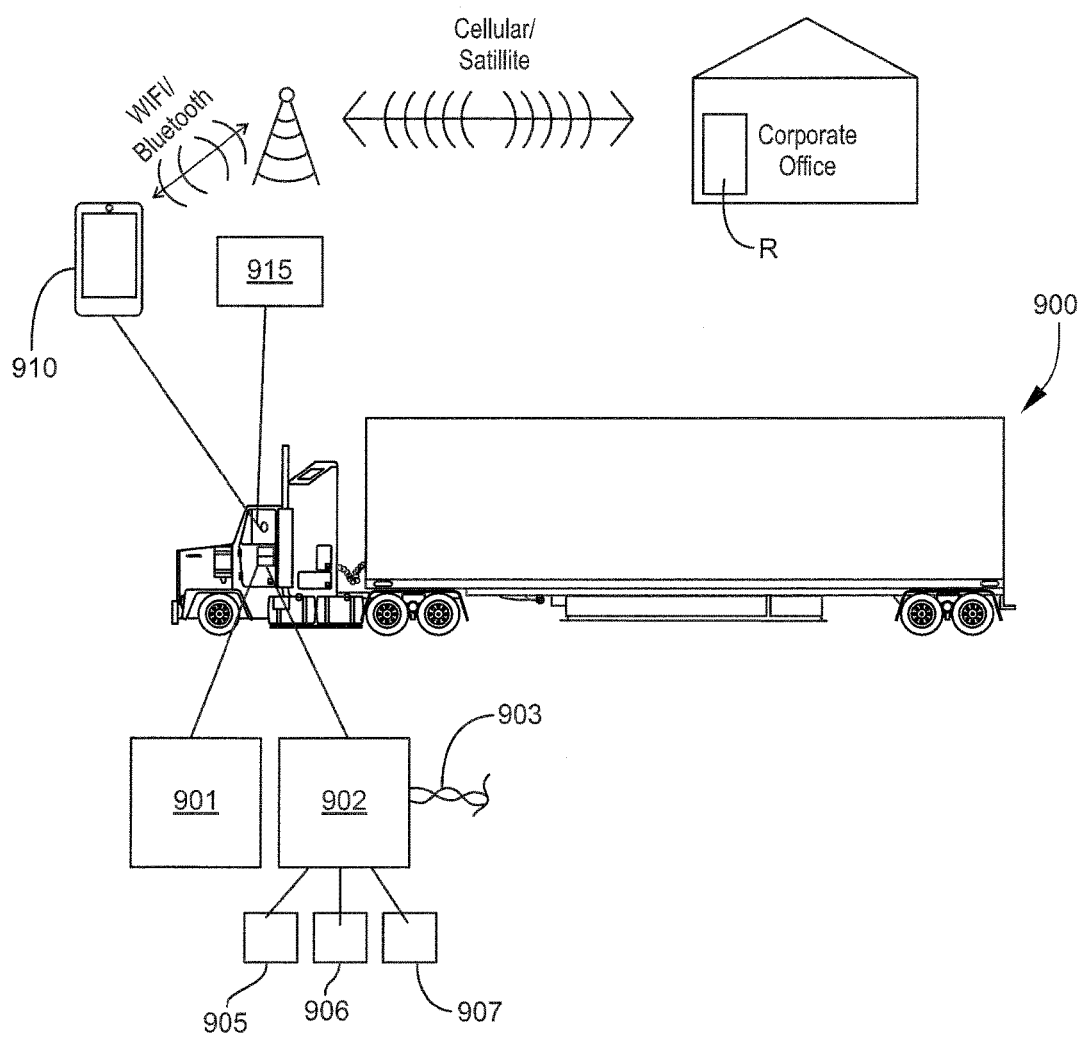
FIGS. 9 and 10 are schematic drawings illustrating various features and devices of an exemplary system and method for managing vehicle fuel purchases.
Figure 10:
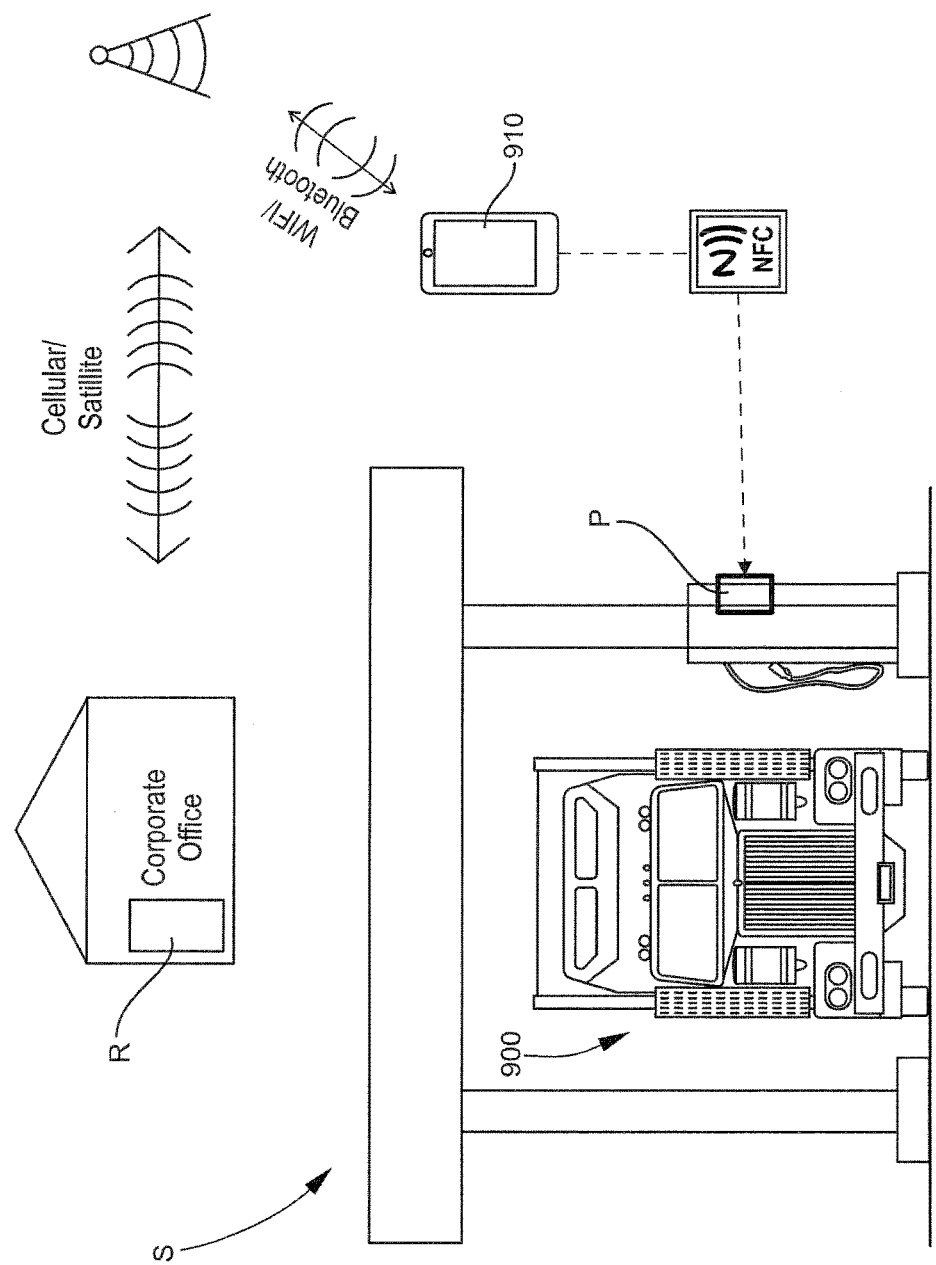
Figure 11:
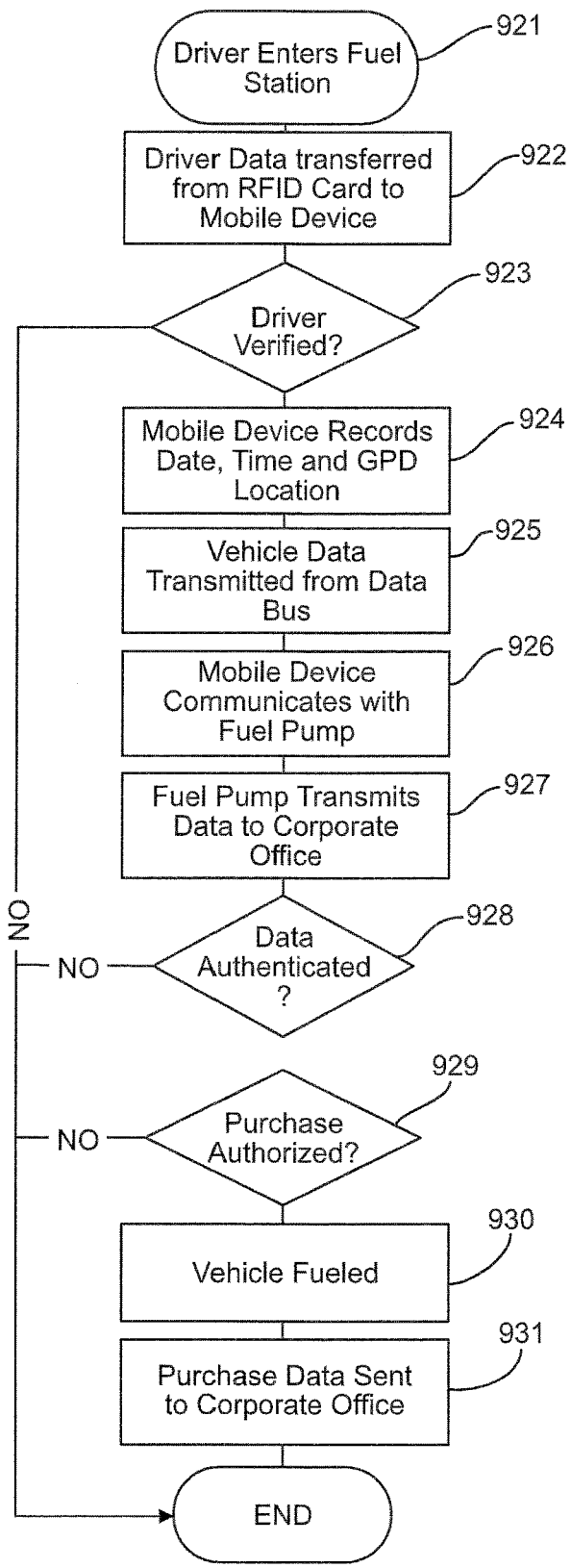
FIG. 11 is a flow diagram illustrating an exemplary implementation of the present system and method for managing vehicle fuel purchases.

FIGS. 9, 10 and 11 illustrate embodiments of a system, method, and apparatus for automated at-the-pump management of vehicle fuel purchases at a fuel station "S". As shown in FIG. 9, the exemplary vehicle 900 (e.g., heavy-duty tractor/trailer combination) includes an electronic on-board recorder 901 (EOBR), such as recorder 200 described above, and a data communications adapter 902 operatively connected to an existing vehicle data bus 903 including, for example, SAE J1708/1587, SAE J1708, SAE J1850, SAE J1939, SAE J2497, SAE J560, OB-2, CAN, and RS-232. The data communications adapter 902 receives and converts the serial packed vehicle data for transmission via wired or wireless communication means. The exemplary data communications adapter 902 incorporates an embedded NFC/RFID transceiver 905, a microcontroller 906, and hardware 907 comprising BLUETOOTH and WIFI communications modules. In alternative embodiments, the data communications adapter 902 is integrated with the EOBR 901, which may also comprise NFC technology and BLUETOOTH, WIFI, and cellular communications modules.

The present disclosure is implemented utilizing a Mobile Device 910 (e.g., smartphone) assigned to and carried by the vehicle driver, and incorporating one or more of the elements and features described above. The exemplary Mobile Device 910 comprises NFC technology allowing it to wirelessly read/write and otherwise communicate data to and from other NFC enabled devices, such as the EOBR 901 and data communications adapter 902. In an exemplary embodiment, the disclosure requires an association between the driver, the vehicle 900, and the driver's Mobile Device 910. As referenced in FIG. 9, the driver carries an NFC/RFID identification card 915 which electronically stores driver data including, for example, first and last name, e-mail address, and telephone number. This same driver data may also be pre-stored in the persistent (non-volatile) memory of the Mobile Device 910—e.g., stored at the time the Mobile Device 910 is assigned to the driver.

Referring to FIGS. 9 and 10 and the flow diagram of FIG. 11, the exemplary method for automated at-the-pump management of vehicle fuel purchases begins as the vehicle 900 enters the fuel station, as indicated at 921 in FIG. 11. At the fuel station, using the NEC-enabled Mobile Device 910 the driver electronically reads the data stored on his NFC/RFID driver identification card 915, as indicated at 922 in FIG. 11. The driver data is wirelessly communicated from the identification card 915 to the Mobile Device 910, and compared in realtime using the processing logic of the Mobile Device 910 to the driver data pre-stored in the persistent memory (or cloud storage). If the driver data read from the identification card 915 matches the data stored in the Mobile Device 910 or cloud storage, the driver will be prompted to enter a verification key (e.g., 4-character code or password) using an input keypad of the Mobile Device 910. In an alternative embodiment, the verification key may comprise a voice code spoken by the driver into the microphone of the Mobile Device 910, and compared using voice recognition software to an audio (voice) clip pre-stored in memory. In another embodiment, the verification key may comprise a driver thumb print captured using the touchscreen of the Mobile Device 910, and compared to a thumb print pre-stored in memory. In yet another embodiment, the verification key may comprise a digital photograph of the driver's face captured using the camera of the Mobile Device 910, and compared using facial recognition software to a digital photograph pre-stored in memory. In further alternative embodiments, the verification key may utilize other biometric data, such as a retinal identifier. The verification key may also comprises a hand drawn pattern entered by the driver on the display screen of the Mobile Device 910, such as disclosed in published U.S. Patent Application, Publication No. US/2013/0212674-A1. The complete disclosure of this prior publication is incorporated herein by reference.

After successful driver verification, as indicated at 923 in FIG. 11, the date and time the driver's identification card 915 was read and the exact GPS location where the reading occurred, collectively "event setting", is recorded in the memory of the Mobile Device 910, as indicated at 924 in FIG. 11, and may be communicated (via WIFI, cellular or satellite transmission) to the EOBR 901 for storage and/or a remote terminal "R" located at a corporate office. The driver then uses the Mobile Device 910, as indicated at 925 in FIG. 11, to capture vehicle data communicated via NFC/RFID transmission (e.g., using "bump data transfer") from the data communications adapter 902 connected to the vehicle data bus 903. The vehicle data may comprise, for example, current fuel level, milage, trailer identification, engine VIN, engine oil level, oil analysis, and diagnostic fault codes. As shown in FIG. 10, after capturing the vehicle data, the driver carries the Mobile Device 910 to a fuel control terminal "P" located at the fuel pump of station "S".

The exemplary fuel control terminal "P" may comprise integrated and/or externally connected hardware (such as transponders, transverters, repreaters, transceivers, transmitters, receivers, antennas, and the like), software, firmware, wireless technology including WIFI and BLUETOOTH, and NFC and other RFID standards enabling wireless transmission and receipt of signals and data (NFC tag reading/rewriting) at 125 kHz, 13 MHz, 315 MHz, 433-434 MHz, and other frequencies. In one embodiment, the fuel control terminal may comprise a microcontroller, 2 GB RAM memory, 8 GB solid state hard drive, keypad, display screen, and communications technology comprising hard wire Cat5/6-TCP/IP, NFC/RFID devices, BLUETOOTH device, cellular 3G/4G, and WIFI 802.11B/G-(WPA2-PSK). The fuel control terminal may also incorporate a cellular modem to communicate collected data directly to the remote terminal, EOBR, vehicle telematics (information and communications technology, or ITC), sealed splice pack system (e.g., VES- PAC™ inline circuit fuse holder), and/or other vehicle-mounted or integrated computing/communications unit.

In the exemplary method, the fuel control terminal "P" receives the driver data and vehicle data (e.g., via NFC bump transfer) from the Mobile Device 910, as indicated at 926 in FIG. 11, and then wirelessly transmits this data to the remote terminal "R" located at the corporate office, as indicated at 927 in FIG. 11. The data is authenticated at the remote terminal "R" using software designed to confirm the driver's association with the vehicle 900 and Mobile Device 910, and to process current fuel level and miles driven since last fueling. After the data is authenticated, as indicated at 928 in FIG. 11, an authorization signal is transmitted from the remote terminal "R" to the at-the-pump fuel control terminal "P", as indicated at 929 in FIG. 11. The authorization signal allows the driver to dispense a pre-determined quantity of fuel from a station pump to the vehicle 900 (including the trailer "reefer"), as indicated at 930 in FIG. 11. After fueling, purchase data including fuel cost and gallons dispensed may be wirelessly transmitted (e.g., via NFC bump transfer), as indicated at 931 in FIG. 11, from the fuel control terminal to the Mobile Device, or from the fuel control terminal directly to the remote terminal, EOBR, or vehicle telematics via cellular or satellite communication.

In the exemplary embodiments described above, certain data is transmitted via short-range communication technologies, such as NFC. This short-range transmission reduces the likelihood of unwanted interception, and is particularly suited for crowded areas where correlating a signal with its transmitting physical device (and by extension, its user) becomes difficult. Additionally, the connection between two NFC-enabled devices is automatically established quickly, generally in less than a tenth of a second, and conveniently.

The exemplary Mobile Device 910 incorporates "active" NFC technology enabling the device to read and write to other active or passive NFC devices (e.g., tags) incorporated in the fuel control terminal "P", EOBR 901, and data communications adapter 902. In an alternative embodiment, the Mobile Device 910 may activate passive NFC tags in the fuel control terminal "P", EOBR 901, and/or data communications adapter 902 to place the associated device in a "discoverable" mode. Once activated or discovered, the Mobile Device 910 may wirelessly connect to the device and communicate data using BLUETOOTH or other short range communications technology.

III. Automated Vehicle Diagnostics

In further exemplary embodiments, the present disclosure comprises systems, methods, and apparatus for diagnosing and managing vehicle faults. As previously described, the vehicle (e.g., heavy-duty tractor/trailer combination) includes an electronic on-board recorder (EOBR) and a data communications adapter operatively connected to an existing vehicle data bus including, for example, SAE J1708/1587, SAE J1708, SAE J1850, SAE J1939, SAE J2497, SAE J560, OB-2, CAN, and RS-232. The exemplary data communications adapter incorporates an embedded NFC/RFID transceiver, a microcontroller, and hardware comprising BLUETOOTH and WIFI communications modules. The data communications adapter may be integrated with the EOBR, which may also comprise NFC technology and BLUETOOTH, WIFI, and cellular communications modules.

In the present application, the exemplary data communications adapter receives, converts, stores, and transmits serial packed vehicle diagnostic data. The diagnostic data can be wirelessly captured from the data communications adapter using Mobile Device, describe above, or a dedicated NFC-enabled portable memory device, such as the IBUTTON® device. The IBUTTON® device automatically wirelessly receives vehicle diagnostic data by simply touching the data communications adapter. After receiving the diagnostic data transmitted by the adapter, the IBUTTON® device can be conveniently carried by the driver or other user to any remote terminal location (e.g., corporate office, vehicle parts store, vehicle service facility), and the diagnostic data transferred to the remote terminal to process the vehicle fault codes. The vehicle faults may also be transmitted from the IBUTTON® device directly to the vehicle's EOBR via NFC bump data transfer or other communication means.

In further embodiments of the present disclosure, the driver's Mobile Device and/or the EOBR may comprise or interface with hardware, software, and firmware designed to monitor driver health conditions including (e.g.) oxygen level, heart rate, breathing patterns, blood pressure, pulse, brainwave patterns, pupil dilation, glucose level, and blood alcohol level. The hardware/sensors may be integrated with the vehicle steering wheel or with other components of the vehicle. The driver health data may be transmitted in real-time from the Mobile Device or EOBR directly to the remote terminal (located at the corporate office).

In other applications, the driver's Mobile Device and/or EOBR may utilize GPS road data to calculate and store any history of vehicle over speeding, and may then report that data to the remote terminal or cloud storage. Mobile Device and/or EOBR may also notify the driver of upcoming high accident areas and work zones, and may record the driver's reaction and maneuvering through such areas.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under 35 U.S.C. § 112(f) [or 6th paragraph/pre-AIA] is not intended. Specifically, use of the claim term "input means" is not intended to invoke a construction under § 112(f). Additionally, it is not intended that the scope of patent protection afforded the present invention be defined by reading into any claim a limitation found herein that does not explicitly appear in the claim itself.

What is claimed:

1. An onboard electronic system for logging and reporting driver activity and operation data of a vehicle, said system comprising:
    an onboard recorder adapted for continuously connecting to a data bus of the vehicle to continuously monitor, obtain and calculate vehicle operation data comprising mileage data, engine use data, time the engine is turned off, speed of the vehicle, and time the engine remains on while the vehicle is not moving, and said onboard recorder comprising a processor, a transmitter, and a memory device for recording and storing said vehicle operation data;
    said transmitter adapted for transmitting said vehicle operation data from said onboard recorder to a portable handheld communications device;
    data processing software operable on the handheld communications device comprising a processor and a display, said data processing software utilized to generate a hours of service log using said vehicle operation data continuously monitored, obtained and calculated from the data bus of the vehicle, and to present the hours of service log in a grid form on the display, the hours of service log comprising a driver's total hours driven today, total hours on duty today, total miles driven today, total hours on duty for seven days, total hours on duty for eight days, and the driver's changes in duty status and the times the duty status changes occurred, whereby the driver's hours of service log is applicable for comparison to a hours of service regulation to determine a compliance status of the driver; and
    a compliance signal emitted by said transmitter and indicating whether said onboard recorder is functioning to record vehicle operation data needed to generate the driver's hours of service log, such that the compliance status of the driver can be accurately determined, and in the event of a malfunction of said onboard recorder, said compliance signal is adapted for activating a visual indicator to the driver signifying an out-of-compliance condition of said onboard recorder.

2. The onboard electronic system according to claim 1, wherein said onboard recorder further comprises an engine control module interface configured to connect to the data bus of the vehicle, a vehicle milage sensing system interface configured to connect to a vehicle mileage sensing system, and a satellite interface configured to connect to a global navigation satellite system.

3. The onboard electronic system according to claim 1, wherein said onboard recorder further comprises at least one data portal configured to upload data from the memory device to a receiver external to the vehicle using a wireless telecommunications network.

4. The onboard electronic system according to claim 1, and comprising a driver interface configured to electronically record driver identification information input by the vehicle driver.

5. The onboard electronic system according to claim 1, and comprising a driver interface configured to electronically record a duty status input by the vehicle driver.

6. The onboard electronic system according to claim 1, and comprising a wired connection between said onboard recorder and the vehicle data bus.

7. The onboard electronic system according to claim 1, and comprising a biometric reader for verifying an identity of the vehicle driver.

8. The onboard electronic system according to claim 1, and comprising a portable memory device reader operable for reading a portable memory device carried by the vehicle driver and configured to electronically store driver identity data.

9. The onboard electronic system according to claim 1, and comprising a camera adapted for visually analyzing and identifying the vehicle driver.

10. The onboard electronic system according to claim 1, wherein the portable handheld communications device comprises an electronic tablet.

11. The onboard electronic system according to claim 1, wherein said onboard recorder further comprises a cable connection interface configured to enable wired transfer of data to and from said memory device.

12. The onboard electronic system according to claim 1, and comprising a self-test button configured to enable the vehicle driver to initiate operability testing of said onboard recorder.

13. An onboard electronic system for logging and reporting driver activity and operation data of a vehicle, said system comprising:
    an onboard recorder adapted for continuously connecting to a data bus of the vehicle to continuously monitor, obtain and calculate vehicle operation data comprising mileage data, engine use data, time the engine is turned off, speed of the vehicle, and time the engine remains on while the vehicle is not moving, and said onboard recorder comprising a processor, a transmitter, a memory device for recording and storing said vehicle operation data, and a cable connection interface configured to enable wired transfer of data to and from said memory device;
    said transmitter adapted for transmitting said vehicle operation data from said onboard recorder to a portable handheld communications device;
    data processing software operable on the handheld communications device comprising a processor and a display, said data processing software utilized to generate a hours of service log using said vehicle operation data continuously monitored, obtained and calculated from the data bus of the vehicle, and to present the hours of service log in a grid form on the display, the hours of service log comprising a driver's total hours driven today, total hours on duty today, total miles driven today, total hours on duty for seven days, total hours on duty for eight days, and the driver's changes in duty status and the times the duty status changes occurred, whereby the driver's hours of service log is applicable for comparison to a hours of service regulation to determine a compliance status of the driver;
    a compliance signal emitted by said transmitter and indicating whether said onboard recorder is functioning to record vehicle operation data needed to generate the driver's hours of service log, such that the compliance status of the driver can be accurately determined, and in the event of a malfunction of said onboard recorder, said compliance signal is adapted for activating a visual indicator to the driver signifying an out-of-compliance condition of said onboard recorder; and
    a self-test button configured to enable the vehicle driver to initiate operability testing of said onboard recorder.

14. A commercial motor vehicle incorporating an onboard electronic system for logging and reporting driver activity and operation data of the vehicle, said system comprising:

an onboard recorder adapted for continuously connecting to a data bus of the vehicle to continuously monitor, obtain and calculate vehicle operation data comprising mileage data, engine use data, time the engine is turned off, speed of the vehicle, and time the engine remains on while the vehicle is not moving, and said onboard recorder comprising a processor, a transmitter, and a memory device for recording and storing said vehicle operation data;

said transmitter adapted for transmitting said vehicle operation data from said onboard recorder to a portable handheld communications device;

data processing software operable on the handheld communications device comprising a processor and a display, said data processing software utilized to generate a hours of service log using said vehicle operation data continuously monitored, obtained and calculated from the data bus of the vehicle, and to present the hours of service log in a grid form on the display, the hours of service log comprising a driver's total hours driven today, total hours on duty today, total miles driven today, total hours on duty for seven days, total hours on duty for eight days, and the driver's changes in duty status and the times the duty status changes occurred, whereby the driver's hours of service log is applicable for comparison to a hours of service regulation to determine a compliance status of the driver; and a compliance signal emitted by said transmitter and indicating whether said onboard recorder is functioning to record vehicle operation data needed to generate the driver's hours of service log, such that the compliance status of the driver can be accurately determined, and in the event of a malfunction of said onboard recorder, said compliance signal is adapted for activating a visual indicator to the driver signifying an out-of-compliance condition of said onboard recorder.

15. The commercial motor vehicle according to claim 14, wherein said onboard recorder further comprises an engine control module interface configured to connect to the data bus of the vehicle, a vehicle milage sensing system interface configured to connect to a vehicle mileage sensing system, and a satellite interface configured to connect to a global navigation satellite system.

16. The commercial motor vehicle according to claim 14, wherein said onboard recorder further comprises at least one data portal configured to upload data from the memory device to a receiver external to the vehicle using a wireless telecommunications network.

17. The commercial motor vehicle according to claim 14, and comprising a driver interface configured to electronically record driver identification information input by the vehicle driver.

18. The commercial motor vehicle according to claim 14, and comprising a driver interface configured to electronically record a duty status input by the vehicle driver.

19. The commercial motor vehicle according to claim 14, wherein said onboard recorder further comprises a cable connection interface configured to enable wired transfer of data to and from said memory device.

20. The commercial motor vehicle according to claim 14, and comprising a wired connection between said onboard recorder and the vehicle data bus.

\* \* \* \* \*

(12) INTER PARTES REVIEW CERTIFICATE (2966th)

United States Patent
Lesesky

(10) Number: US 10,157,384 K1
(45) Certificate Issued: Jan. 13, 2023

(54) SYSTEM FOR LOGGING AND REPORTING DRIVER ACTIVITY AND OPERATION DATA OF A VEHICLE

(71) Applicant: Innovative Global Systems, LLC

(72) Inventor: Alan C. Lesesky

Trial Number:

IPR2020-00694 filed Mar. 10, 2020

Inter Partes Review Certificate for:

Patent No.: 10,157,384
Issued: Dec. 18, 2018
Appl. No.: 15/843,750
Filed: Dec. 15, 2017

The results of IPR2020-00694 are reflected in this inter partes review certificate under 35 U.S.C. 318(b).

INTER PARTES REVIEW CERTIFICATE
U.S. Patent 10,157,384 K1
Trial No. IPR2020-00694
Certificate Issued Jan. 13, 2023

AS A RESULT OF THE INTER PARTES REVIEW PROCEEDING, IT HAS BEEN DETERMINED THAT:

Claims 1-11 and 14-20 are cancelled.

\* \* \* \* \*